United States Patent
Hayashi et al.

(10) Patent No.: US 12,470,829 B2
(45) Date of Patent: *Nov. 11, 2025

(54) PROCESSING APPARATUS, ELECTRONIC APPARATUS, PROCESSING METHOD, AND PROGRAM

(71) Applicant: FUJIFILM Corporation, Tokyo (JP)

(72) Inventors: Kenkichi Hayashi, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,991

(22) Filed: Apr. 2, 2024

(65) Prior Publication Data
US 2024/0251170 A1 Jul. 25, 2024

Related U.S. Application Data

(63) Continuation of application No. 17/698,790, filed on Mar. 18, 2022, now Pat. No. 11,979,666, which is a
(Continued)

(30) Foreign Application Priority Data

Sep. 30, 2019 (JP) .................. 2019-180386

(51) Int. Cl.
*G01S 17/86* (2020.01)
*G03B 13/34* (2021.01)
(Continued)

(52) U.S. Cl.
CPC ............. *H04N 23/72* (2023.01); *G01S 17/86* (2020.01); *G03B 13/34* (2013.01); *G06T 7/521* (2017.01);
(Continued)

(58) Field of Classification Search
CPC ...... H04N 23/11; H04N 23/61; H04N 23/611; H04N 23/671; G01S 17/88–894
(Continued)

(56) References Cited

U.S. PATENT DOCUMENTS

| 9,912,861 B1 | 3/2018 | Solh et al. |
| 2002/0036765 A1 | 3/2002 | McCaffrey et al. |

(Continued)

FOREIGN PATENT DOCUMENTS

| CN | 104270570 A | 1/2015 |
| JP | 2004-191634 A | 7/2004 |

(Continued)

OTHER PUBLICATIONS

An Office Action mailed by China National Intellectual Property Administration on Sep. 4, 2024, which corresponds to Chinese Patent Application No. 202080065705.5 and is related to U.S. Appl. No. 18/624,991; with English language translation.
(Continued)

*Primary Examiner* — Anthony J Daniels
(74) *Attorney, Agent, or Firm* — Studebaker Brackett PLLC

(57) ABSTRACT

A processing apparatus includes a control unit that performs a control of performing, a plurality of times in parallel, a recognition operation in which a recognition unit recognizes a specific subject included in an imaging region based on a captured image obtained by imaging the imaging region by an imaging unit, and a distance measurement operation in which a distance measurement unit performs distance measurement by emitting light to the imaging region and receiving reflected light of the light from the imaging region, and a change unit that changes irradiation energy of the light to the imaging region for each distance measurement operation.

25 Claims, 22 Drawing Sheets

Related U.S. Application Data continuation of application No. PCT/JP2020/028910, filed on Jul. 28, 2020.

(51) Int. Cl.

| | | |
|---|---|---|
| *G06T 7/521* | (2017.01) | |
| *G06V 20/50* | (2022.01) | |
| *G06V 40/16* | (2022.01) | |
| *H04N 23/11* | (2023.01) | |
| *H04N 23/56* | (2023.01) | |
| *H04N 23/611* | (2023.01) | |
| *H04N 23/63* | (2023.01) | |
| *H04N 23/67* | (2023.01) | |
| *H04N 23/72* | (2023.01) | |

(52) U.S. Cl.
CPC ............ *G06V 20/50* (2022.01); *G06V 40/174* (2022.01); *H04N 23/56* (2023.01); *H04N 23/611* (2023.01); *H04N 23/633* (2023.01); *H04N 23/671* (2023.01); *H04N 23/675* (2023.01); *G06T 2207/10028* (2013.01); *G06T 2207/30201* (2013.01); *H04N 23/11* (2023.01)

(58) Field of Classification Search
USPC ......................................................... 348/345
See application file for complete search history.

(56) References Cited

U.S. PATENT DOCUMENTS

| | | | |
|---|---|---|---|
| 2008/0237445 A1 | 10/2008 | Ikeno et al. | |
| 2010/0104266 A1 | 4/2010 | Yashiro et al. | |
| 2017/0045616 A1 | 2/2017 | Masuda et al. | |
| 2017/0061632 A1 | 3/2017 | Lindner et al. | |
| 2017/0200273 A1* | 7/2017 | Kamilov | G01S 17/86 |
| 2018/0191948 A1 | 7/2018 | Zheng | |
| 2018/0343401 A1* | 11/2018 | Campbell | H04N 23/45 |
| 2019/0220650 A1 | 7/2019 | Lindner et al. | |
| 2019/0346743 A1 | 11/2019 | Torobu | |
| 2020/0025932 A1 | 1/2020 | Saitou et al. | |
| 2021/0144314 A1 | 5/2021 | Azuma et al. | |
| 2022/0132043 A1* | 4/2022 | Park | H04N 17/002 |

FOREIGN PATENT DOCUMENTS

| | | |
|---|---|---|
| JP | 2006-065355 A | 3/2006 |
| JP | 2006-171120 A | 6/2006 |
| JP | 2008-241435 A | 10/2008 |
| JP | 2009-175821 A | 8/2009 |
| JP | 2010-066221 A | 3/2010 |
| JP | 2010-109592 A | 5/2010 |
| JP | 2014-062982 A | 4/2014 |
| JP | 6321145 B2 | 5/2018 |
| JP | 2018-526641 A | 9/2018 |
| JP | 2019-152924 A | 9/2019 |
| WO | 2018/142993 A1 | 8/2018 |
| WO | 2018/180391 A1 | 10/2018 |
| WO | 2019/163212 A1 | 8/2019 |
| WO | 2022/038991 A1 | 2/2022 |

OTHER PUBLICATIONS

International Search Report issued in PCT/JP2020/028910; mailed Oct. 6, 2020.

Written Opinion of the International Searching Authority issued in PCT/JP2020/028910; mailed Oct. 6, 2020.

An Office Action; "Notice of Reasons for Refusal," mailed by the Japanese Patent Office on Jan. 17, 2023, which corresponds to Japanese Patent Application No. 2021-550379 and is related to U.S. Appl. No. 17/698,790; with English language translation.

An Office Action mailed by the Japanese Patent Office on Aug. 6, 2024, which corresponds to Japanese Patent Application No. 2023-111686 and is related to U.S. Appl. No. 18/624,991.

An Office Action mailed by China National Intellectual Property Administration on Mar. 3, 2025, which corresponds to Chinese Patent Application No. 202080065705.5 and is related to U.S. Appl. No. 18/624,991; with English language translation.

* cited by examiner

PROCESSING APPARATUS, ELECTRONIC APPARATUS, PROCESSING METHOD, AND PROGRAM

CROSS-REFERENCE TO RELATED APPLICATIONS

This application is a continuation of U.S. application Ser. No. 17/698,790, filed Mar. 18, 2022, which is a continuation application of International Application No. PCT/JP2020/028910, filed Jul. 28, 2020, the disclosure of which is incorporated herein by reference in its entirety. Further, this application claims priority under 35 USC 119 from Japanese Patent Application No. 2019-180386 filed Sep. 30, 2019, the disclosure of which is incorporated by reference herein.

BACKGROUND

1. Technical Field

The technology of the present disclosure relates to a processing apparatus, an electronic apparatus, a processing method, and a program.

2. Related Art

JP6321145B discloses a distance measurement device. The distance measurement device disclosed in JP6321145B includes an imaging unit which captures a subject image formed by an imaging optical system forming the subject image showing a subject; an emission unit which emits a directional light beam as light having directivity along an optical axis direction of the imaging optical system, in which the emission unit is able to adjust the emission intensity of the directional light beam and adjusts an emission intensity based on at least one of focusing state specification information or either one of subject brightness or exposure state specification information to emit the directional light beam; a light receiving unit which receives reflected light of the directional light beam from the subject; a derivation unit which derives a distance to the subject based on a timing at which the directional light beam is emitted by the emission unit and a timing at which the reflected light is received by the light receiving unit; an execution unit which executes at least one of focus adjustment of the imaging optical system with respect to the subject or exposure adjustment prior to imaging by the imaging unit; a reception unit which receives a two-stage pressing operation including a first pressing operation that is an imaging preparation instruction to make the execution unit start the execution of the at least one of the focus adjustment or the exposure adjustment and a second pressing operation that is an imaging instruction to make the execution unit start main exposure by the imaging unit; and a control unit which performs control such that the at least one of the focus adjustment or the exposure adjustment is executed by the execution unit in a case in which the first pressing operation is received by the reception unit, performs control such that execution of a distance measurement by the emission unit, the light receiving unit, and the derivation unit is started in a case in which the at least one of the focus adjustment or the exposure adjustment is executed, performs control such that a presentation unit, which present information, presents information relating to a result of the distance measurement in a state in which the first pressing operation is maintained after the distance measurement is completed, and then performs control such that the main exposure is performed by the imaging unit in a case in which the second pressing operation is successively received by the reception unit after the first pressing operation without a pressing operation being released at the reception unit.

JP2006-171120A discloses an imaging apparatus. The imaging apparatus disclosed in JP2006-171120A is an imaging apparatus that detects subject contrast and adjusts focus prior to an imaging operation, and comprises a first auxiliary light emitter that emits a subject with light having a relatively wide wavelength range for subject contrast detection, a second auxiliary light emitter that emits light having a relatively narrow wavelength range to the subject for subject contrast detection, and a switching unit that switches between the first auxiliary light emitter and the second auxiliary light emitter.

WO2018/142993A discloses a light emission control device. The light emission control device disclosed in WO2018/142993A comprises a light amount setting unit that sets a light amount of auto focus (AF) auxiliary light, and a light emission control unit that controls the light emission of the AF auxiliary light according to the setting by the light amount setting unit.

SUMMARY

One embodiment according to the technology of the present disclosure provides a processing apparatus, an electronic apparatus, a processing method, and a program that can achieve both the distance measurement and the recognition of a specific subject with high accuracy as compared to a case in which the distance measurement based on light, which is always emitted at the same irradiation energy to an imaging region, and the recognition of the specific subject included in the imaging region are performed at the same time.

A first aspect according to the technology of the present disclosure relates to a processing apparatus including a control unit that performs a control of performing, a plurality of times in parallel, a recognition operation in which a recognition unit recognizes a specific subject included in an imaging region based on a captured image obtained by imaging the imaging region by an imaging unit, and a distance measurement operation in which a distance measurement unit performs distance measurement by emitting light to the imaging region and receiving reflected light of the light from the imaging region, and a change unit that changes irradiation energy of the light to the imaging region for each distance measurement operation.

A second aspect according to the technology of the present disclosure relates to the processing apparatus according to the first aspect, further including an output unit that outputs a recognition result obtained by the recognition operation and a distance measurement result obtained by the distance measurement operation to a specific output destination according to a specific time among the plurality of times.

A third aspect according to the technology of the present disclosure relates to the processing apparatus according to the second aspect, in which the specific output destination is a display unit capable of displaying at least one of the recognition result or the distance measurement result.

A fourth aspect according to the technology of the present disclosure relates to the processing apparatus according to the third aspect, in which the display unit displays a specific subject image showing the specific subject and an image surrounding the specific subject image as the recognition result.

A fifth aspect according to the technology of the present disclosure relates to the processing apparatus according to any one of the first to fourth aspects, in which the imaging unit includes a lens capable of moving along an optical axis, and the control unit moves the lens along the optical axis to a position on the optical axis, the position being determined according to a distance measurement result obtained by the distance measurement operation.

A sixth aspect according to the technology of the present disclosure relates to the processing apparatus according to the fifth aspect, in which the position is a focus position.

A seventh aspect according to the technology of the present disclosure relates to the processing apparatus according to any one of the first to fourth aspects, in which the imaging unit includes a lens capable of moving along an optical axis, the distance measurement unit performs distance measurement for a focus control by emitting light for a focus control to the imaging region and receiving reflected light for a focus control of the light for a focus control to the imaging region prior to the recognition operation, and the control unit moves the lens along the optical axis to a focus position determined according to a distance measurement result obtained by the distance measurement for a focus control.

An eighth aspect according to the technology of the present disclosure relates to the processing apparatus according to any one of the first to seventh aspects, further including a processing unit that performs specific processing using a plurality of recognition results obtained by the recognition operation performed the plurality of times.

A ninth aspect according to the technology of the present disclosure relates to the processing apparatus according to any one of the first to eighth aspects, in which a recognition result obtained by the recognition operation is weighted according to at least one of the specific subject or the irradiation energy used in the distance measurement operation parallel to the recognition operation.

A tenth aspect according to the technology of the present disclosure relates to the processing apparatus according to the ninth aspect, in which the control unit causes the imaging unit to perform imaging by main exposure based on the recognition result selected according to the weighting.

An eleventh aspect according to the technology of the present disclosure relates to the processing apparatus according to any one of the first to tenth aspects, in which the specific subject is a face.

A twelfth aspect according to the technology of the present disclosure relates to the processing apparatus according to the eleventh aspect, in which the face is a face with a specific facial expression.

A thirteenth aspect according to the technology of the present disclosure relates to the processing apparatus according to any one of the first to tenth aspects, in which the specific subject is an object having a reflectivity less than a threshold value.

A fourteenth aspect according to the technology of the present disclosure relates to an electronic apparatus including the processing apparatus according to any one of the first to thirteenth aspects, and at least one of the recognition unit or the distance measurement unit.

A fifteenth aspect according to technology of the present disclosure relates to a processing method including performing a control of performing, a plurality of times in parallel, a recognition operation in which a recognition unit recognizes a specific subject included in an imaging region based on a captured image obtained by imaging the imaging region by an imaging unit, and a distance measurement operation in which a distance measurement unit performs distance measurement by emitting light to the imaging region and receiving reflected light of the light from the imaging region, and changing irradiation energy of the light to the imaging region for each distance measurement operation.

A sixteenth aspect according to technology of the present disclosure relates to a program causing a computer to execute a process including performing a control of performing, a plurality of times in parallel, a recognition operation in which a recognition unit recognizes a specific subject included in an imaging region based on a captured image obtained by imaging the imaging region by an imaging unit, and a distance measurement operation in which a distance measurement unit performs distance measurement by emitting light to the imaging region and receiving reflected light of the light from the imaging region, and changing irradiation energy of the light to the imaging region for each distance measurement operation.

BRIEF DESCRIPTION OF THE DRAWINGS

Exemplary embodiments of the technology of the disclosure will be described in detail based on the following figures, wherein.

DETAILED DESCRIPTION

Hereinafter, an example of embodiments of a distance measurement imaging apparatus according to the technology of the present disclosure will be described with reference to the accompanying drawings.

First, the terms used in the following description will be described.

CPU refers to an abbreviation of "central processing unit". RAM refers to an abbreviation of "random access memory". ASIC refers to an abbreviation of "application specific integrated circuit". PLD refers to an abbreviation of "programmable logic device". FPGA refers to an abbreviation of "field-programmable gate array". SOC refers to an abbreviation of "system-on-a-chip". SSD refers to an abbreviation of "solid state drive". USB refers to an abbreviation of "universal serial bus". HDD refers to an abbreviation of "hard disk drive". EEPROM refers to an abbreviation of "electrically erasable and programmable read only memory". EL refers to an abbreviation of "electro-luminescence". A/D refers to an abbreviation of "analog/digital". I/F refers to an abbreviation of "interface". UI refers to an abbreviation of "user interface". LTE refers to an abbreviation of "long term evolution". 5G refers to an abbreviation of "5th generation". LD refers to an abbreviation of "laser diode". IR refers to an abbreviation of "infrared". APD refers to an abbreviation of "avalanche photodiode". fps refers to an abbreviation of "frame per second". LED refers to an abbreviation of "light emitting diode". ROI refers to an abbreviation of "region of interest". LAN refers to an abbreviation of "local area network". Exif refers to an abbreviation of "exchangeable image file format".

In the description of the present specification, "horizontal" means the horizontality in the sense of including an error generally allowed in the technical field to which the technology of the present disclosure belongs, in addition to the exact horizontality. In the description of the present specification, "parallel" means the parallelism in the sense of including an error generally allowed in the technical field to which the technology of the present disclosure belongs, in addition to the exact parallelism. In the description of the present specification, "vertical" means the verticality in the sense of including an error generally allowed in the technical field to which the technology of the present disclosure belongs, in addition to the exact verticality. In the description of the present specification, "same" means the same in the sense of including an error generally allowed in the technical field to which the technology of the present disclosure belongs, in addition to the exact same. In addition, in the description of the present specification, the numerical range represented by using "to" means a range including numerical values denoted before and after "to" as a lower limit value and an upper limit value.

First Embodiment

Figure 1:
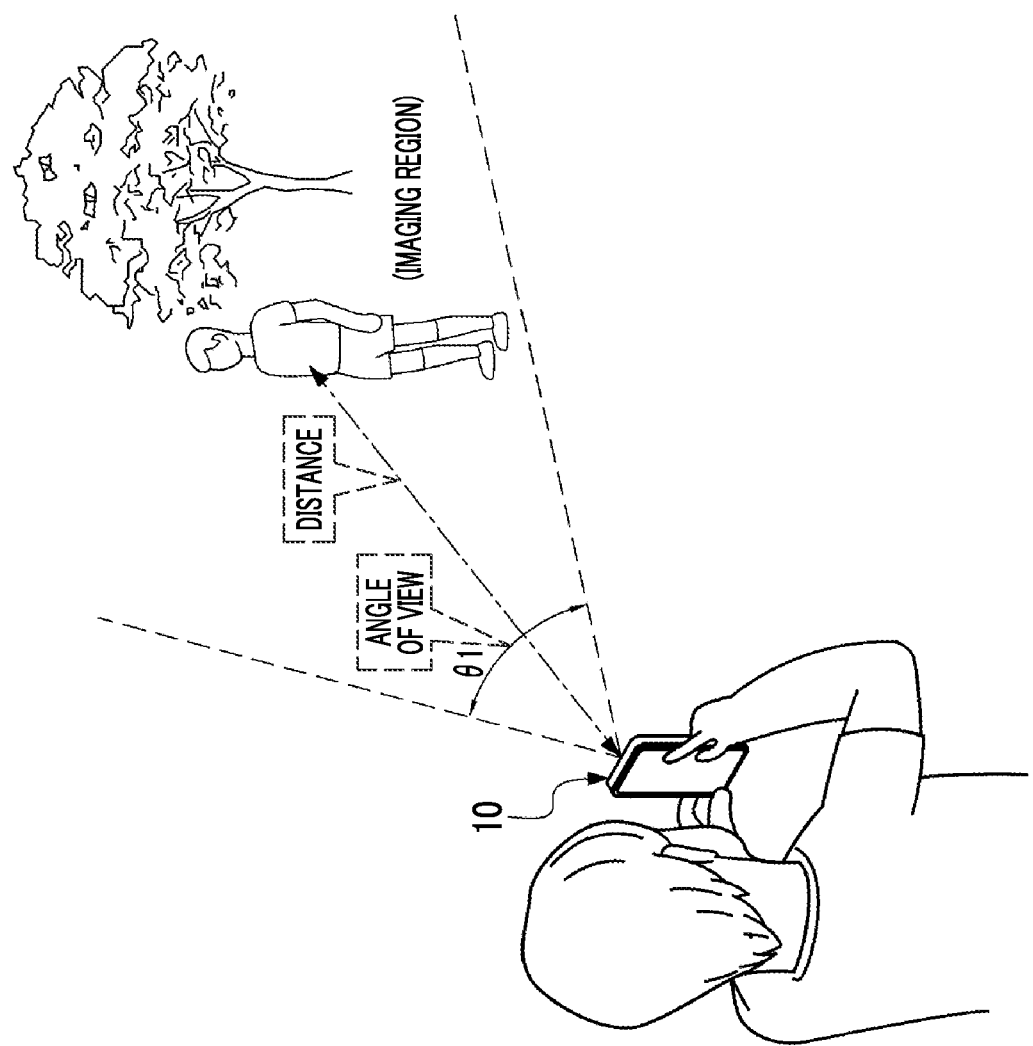
FIG. 1 is a schematic perspective view showing an example of a usage aspect of a smart device according to a first embodiment.

As shown in FIG. 1 as an example, a smart device 10 according to a first embodiment performs a recognition operation of recognizing a specific subject included in an imaging region defined by an angle of view θ1 based on a captured image obtained by imaging the imaging region, and a distance measurement operation of performing the distance measurement by emitting a laser beam to the imaging region and receiving reflected light of the laser beam from the imaging region. The laser beam is an example of "light" according to the technology of the present disclosure.

In the present embodiment, the "distance measurement" refers to processing of measuring a distance from the smart device 10 to a distance measurement target in the imaging region. In addition, here, the "distance measurement target" refers to an object that reflects the light, and in the example shown in FIG. 1, a person and a tree are shown as the distance measurement targets in the imaging region. Note that examples of the smart device 10 include a smartphone or a tablet terminal, which is an electronic apparatus having an imaging function.

Figure 2:
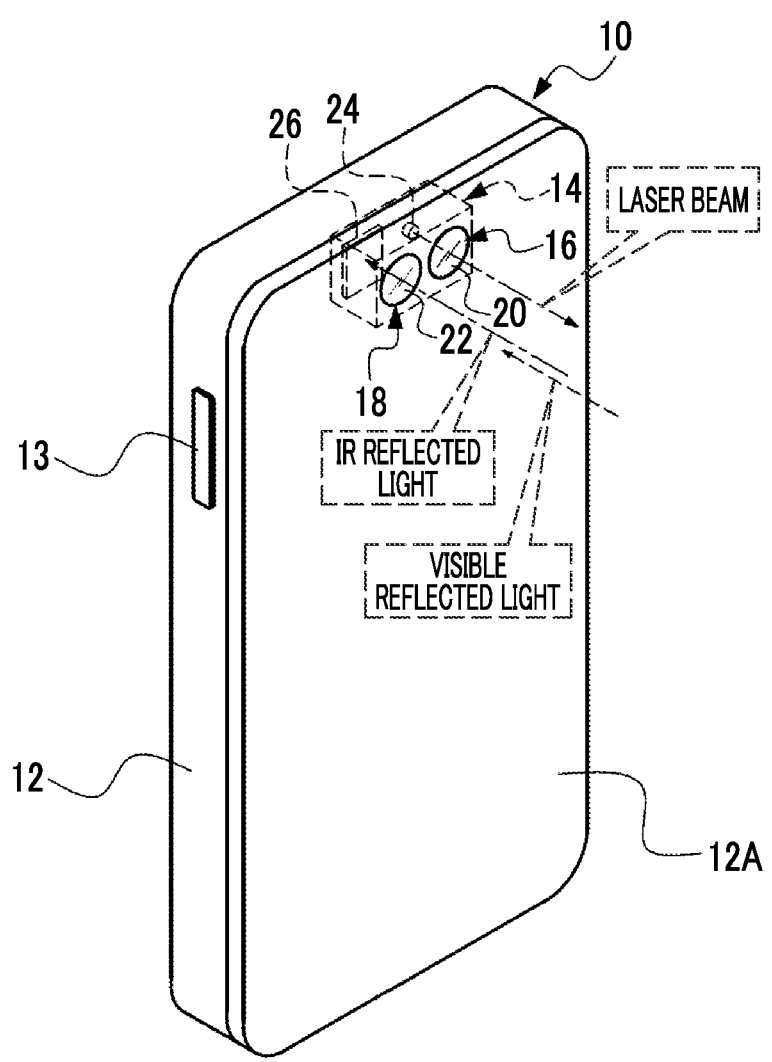
FIG. 2 is a rear perspective view showing an example of the appearance of a rear side of the smart device according to the first embodiment.

As shown in FIG. 2 as an example, the smart device 10 comprises a housing 12. A distance measurement imaging apparatus 14 is housed in the housing 12. The distance measurement imaging apparatus 14 comprises a light irradiator 16 and a light receiver 18. The light irradiator 16 comprises an LD 24, and the light receiver 18 comprises a photoelectric conversion element 26. In the smart device 10, the imaging operation and the distance measurement operation are performed by the distance measurement imaging apparatus 14. Note that the distance measurement imaging apparatus 14 is an example of an "imaging unit (imaging apparatus)" and a "distance measurement unit (distance measurement device)" according to the technology of the present disclosure.

An instruction key 13 is disposed on a side surface of the smart device 10. The instruction key 13 receives various instructions. Here, the "various instructions" refers to, for example, an instruction for displaying a menu screen on which various menus can be selected, an instruction for selecting one or a plurality of menus, an instruction for confirming a selected content, and an instruction for deleting the selected content.

Light transmitting windows 20 and 22 are provided in an upper portion of a rear surface 12A of the housing 12 in a case in which the smart device 10 is put into a vertically placed state (an upper portion of the rear view of the smart device 10 in the vertically placed state). The light transmitting windows 20 and 22 are optical elements having transmittance (for example, a lens), are arranged at a predetermined interval (for example, an interval of several millimeters) along a horizontal direction, and are exposed from the rear surface 12A. The light irradiator 16 emits the laser beam emitted from the LD 24 to the distance measurement target through the light transmitting window 20. In the present embodiment, the laser beam having an infrared wavelength range is adopted. However, the wavelength range of the laser beam is not limited to this, and the laser beam having another wavelength range may be used.

The light receiver 18 takes in IR reflected light through the light transmitting window 22. The IR reflected light refers to the reflected light of the laser beam emitted to the distance measurement target by the light irradiator 16. In addition, the light receiver 18 takes in visible reflected light through the light transmitting window 22. The visible reflected light refers to the reflected light of the visible light (for example, the visible light included in sunlight) emitted to the imaging region. Note that, in the following, for convenience of description, in a case in which the distinction is not necessary, the IR reflected light and the visible reflected light are simply referred to as "reflected light".

The light receiver 18 comprises the photoelectric conversion element 26, and the photoelectric conversion element 26 receives the reflected light taken into the light receiver 18 through the light transmitting window 22, and outputs an electric signal according to a light amount of the received reflected light.

Figure 3:
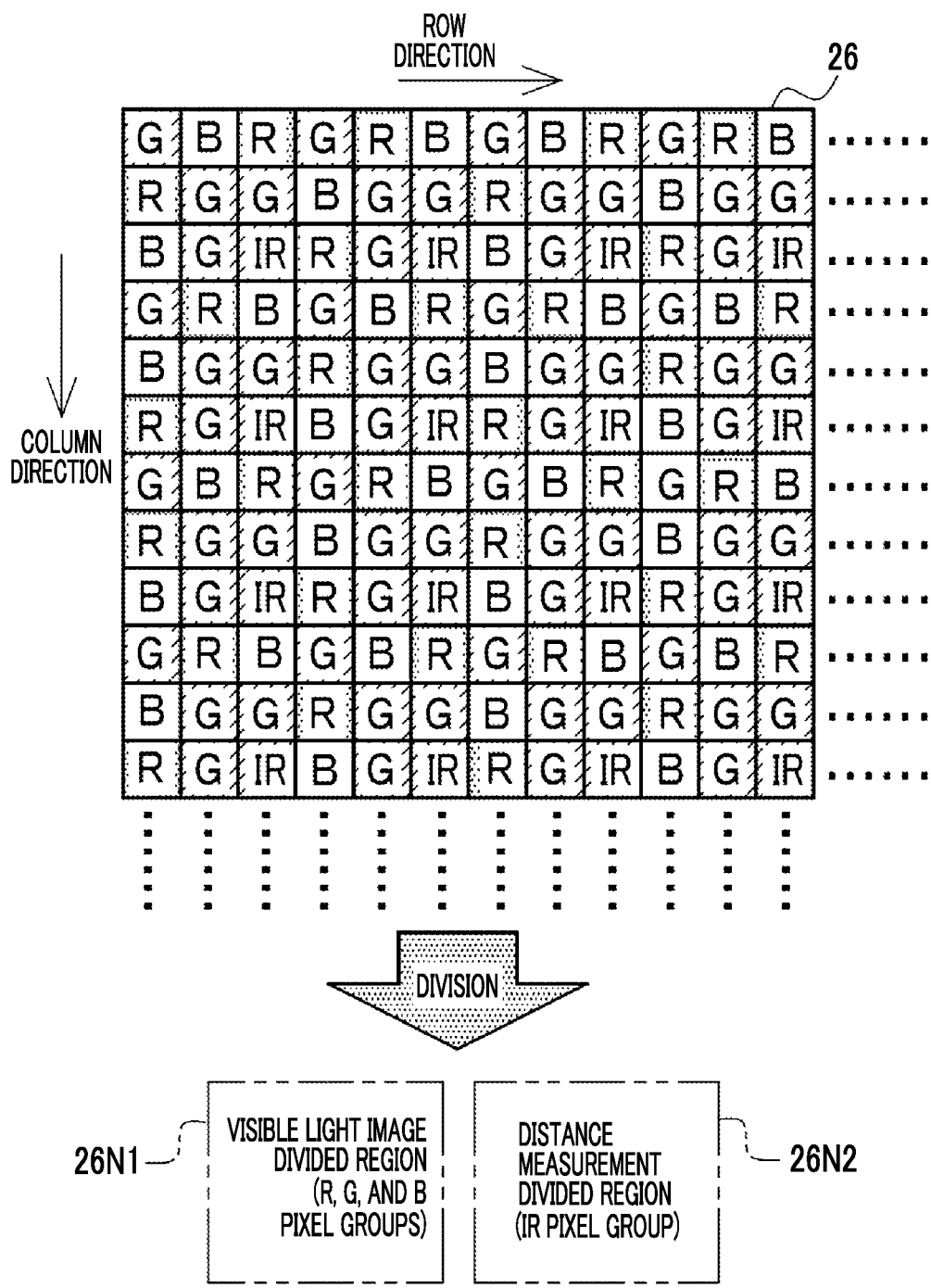
FIG. 3 is a schematic perspective view showing an example of a structure of a photoelectric conversion element provided in the smart device according to the first embodiment.

As shown in FIG. 3 as an example, the photoelectric conversion element 26 has a plurality of photodiodes arranged in a matrix. Examples of the plurality of photodiodes include a photodiode for "4896×3265" pixels.

A color filter is disposed in each photodiode included in the photoelectric conversion element 26. The color filters include a green (G) filter corresponding to a G wavelength range, a red (R) filter corresponding to an R wavelength range, a blue (B) filter corresponding to a B wavelength range, and an infrared (IR) filter corresponding to an IR wavelength range. Note that in the present embodiment, the G filter, the R filter, and the B filter also have a function as an infrared light cut filter that cuts infrared light. In addition, in the following, for convenience of description, in a case in which the distinction is not necessary, the G filter, the R filter, and the B filter are also referred to as a "visible light filter".

The photoelectric conversion element 26 has an R pixel, a G pixel, a B pixel, and an IR pixel. The R pixel is a pixel corresponding to the photodiode in which the R filter is disposed, the G pixel is a pixel corresponding to the photodiode in which the G filter is disposed, the B pixel is a pixel corresponding to the photodiode in which the B filter is disposed, and the IR pixel is a pixel corresponding to the photodiode in which the IR filter is disposed. The R pixels, the G pixels, the B pixels, and the IR pixels are arranged in each of a row direction (horizontal direction) and a column direction (vertical direction) with a predetermined periodicity. In the present embodiment, the array of the R pixels, the G pixels, the B pixels, and the IR pixels is an array obtained by replacing some G pixels with the IR pixels in the X-Trans (registered trademark) array. The IR pixels are arranged along the row direction and the column direction with a specific periodicity.

Note that, here, the array based on the X-trans array has been described as an example of the array of the R pixels, the G pixels, the B pixels, and the IR pixels, but the technology of the present disclosure is not limited to this, the array of the R pixels, the G pixels, the B pixels, and the IR pixels may be the array based on other arrays, such as Bayer array or honeycomb (registered trademark) array.

In addition, here, among the arrays generally known as the array of the R pixels, the G pixels, and the B pixels, an array obtained by replacing some G pixels with the IR pixels has been described as an example of the array of the R pixels, the G pixels, the B pixels, and the IR pixels, but the technology of the present disclosure is not limited to this. For example, each color filter corresponding to each of the R pixel, the G pixel, and the B pixel (hereinafter, these are also referred to as a "visible light pixel") is set as a color filter that also transmits the infrared light, and a pair of photodiodes of a photodiode for the visible light pixel and a photodiode for the IR pixel (for example, InGaAs APD) may be disposed for one color filter.

In the present embodiment, the photoelectric conversion element 26 is divided into two regions. That is, the photoelectric conversion element 26 has a visible light image divided region 26N1 and a distance measurement divided region 26N2. The visible light image divided region 26N1 is a visible light pixel group including a plurality of visible light pixels, and is used for generating the visible light image. The distance measurement divided region 26N2 is an IR pixel group including a plurality of IR pixels and is used for the distance measurement. The visible light image divided region 26N1 receives the visible reflected light and outputs the electric signal according to the light reception amount. The distance measurement divided region 26N2 receives the IR reflected light and outputs the electric signal according to the light reception amount.

Figure 4:
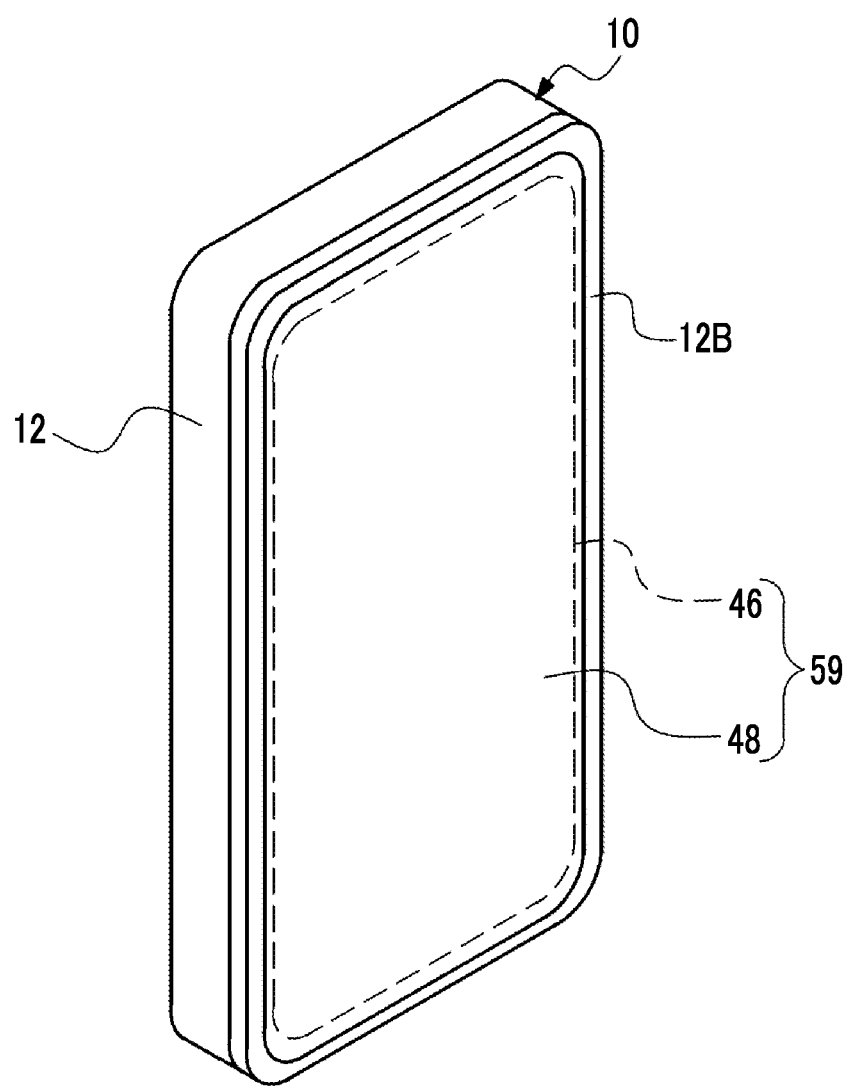
FIG. 4 is a front perspective view showing an example of the appearance of a front side of the smart device shown in FIG. 2.

As shown in FIG. 4 as an example, a touch panel display 59 is provided on a front surface 12B of the housing 12. The touch panel display 59 comprises a display 46 and a touch panel 48. Examples of the display 46 include an organic EL display. The display 46 may not be the organic EL display, but may be another type of display, such as a liquid crystal display. Note that the display 46 is an example of a "display unit" according to the technology of the present disclosure.

The display 46 displays an image, text information, and the like. The touch panel 48 is a transmissive touch panel and is superimposed on a surface of a display region of the display 46. The touch panel 48 receives an instruction from a user by detecting contact with an indicator, such as a finger or a stylus pen. Note that, here, examples of the touch panel display 59 include an out-cell type touch panel display in which the touch panel 48 is superimposed on the surface of the display region of the display 46, but this is merely an example. For example, an on-cell type or in-cell type touch panel display can be applied as the touch panel display 59.

Figure 5:
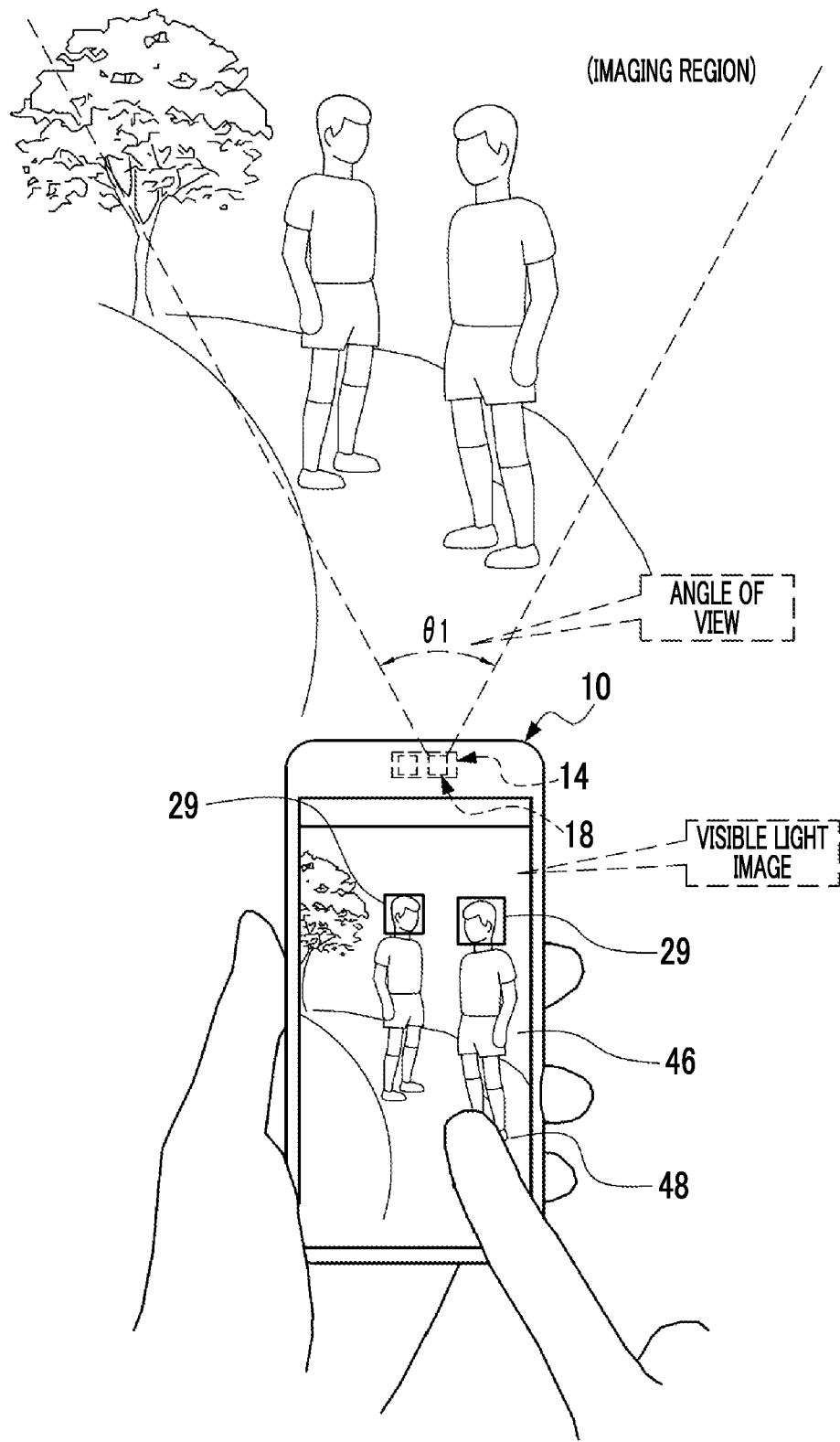
FIG. 5 is a conceptual diagram showing an example of an aspect in which an imaging region is imaged by a distance measurement imaging apparatus provided in the smart device according to the first embodiment and a visible light image is displayed on a display.

As shown in FIG. 5 as an example, in the smart device 10, in a case in which an instruction for starting imaging is received by the touch panel 48, the imaging region is imaged by the light receiver 18. That is, the light receiver 18 receives the visible reflected light and generates the visible light image showing the imaging region as an image according to the received visible reflected light. The visible light image is an example of a "captured image" according to the technology of the present disclosure.

The visible light image is displayed on the display 46 in response to an instruction received by the touch panel 48. In the example shown in FIG. 5, the imaging region is defined by the angle of view θ1. The angle of view θ1 is changed in response to an instruction received by the touch panel 48.

The smart device 10 has an image recognition function. By activating the image recognition function, the smart device 10 recognizes a face image showing a face of the person from the visible light image. In the smart device 10, the recognition operation of recognizing the face of the person included in the imaging region (hereinafter, also simply referred to as "recognition operation") is performed. The recognition operation is realized by activating the image recognition function, that is, by recognizing the face image from the visible light image. In the example shown in FIG. 5, the face image is recognized from the visible light image, and as a recognition result, a frame line 29 is displayed in a state of surrounding the face image. The recognition result includes, for example, a recognized face image, the number of recognized face images (hereinafter, also referred to as "the number of face images"), a coordinate for specifying the position of the face image, and frame line information indicating the frame line 29. Note that the face of the person is an example of a "specific subject" according to the technology of the present disclosure. In addition, the frame line 29 is an example of a "distance measurement result" and an "image surrounding the specific subject image" according to the technology of the present disclosure.

Figure 6:
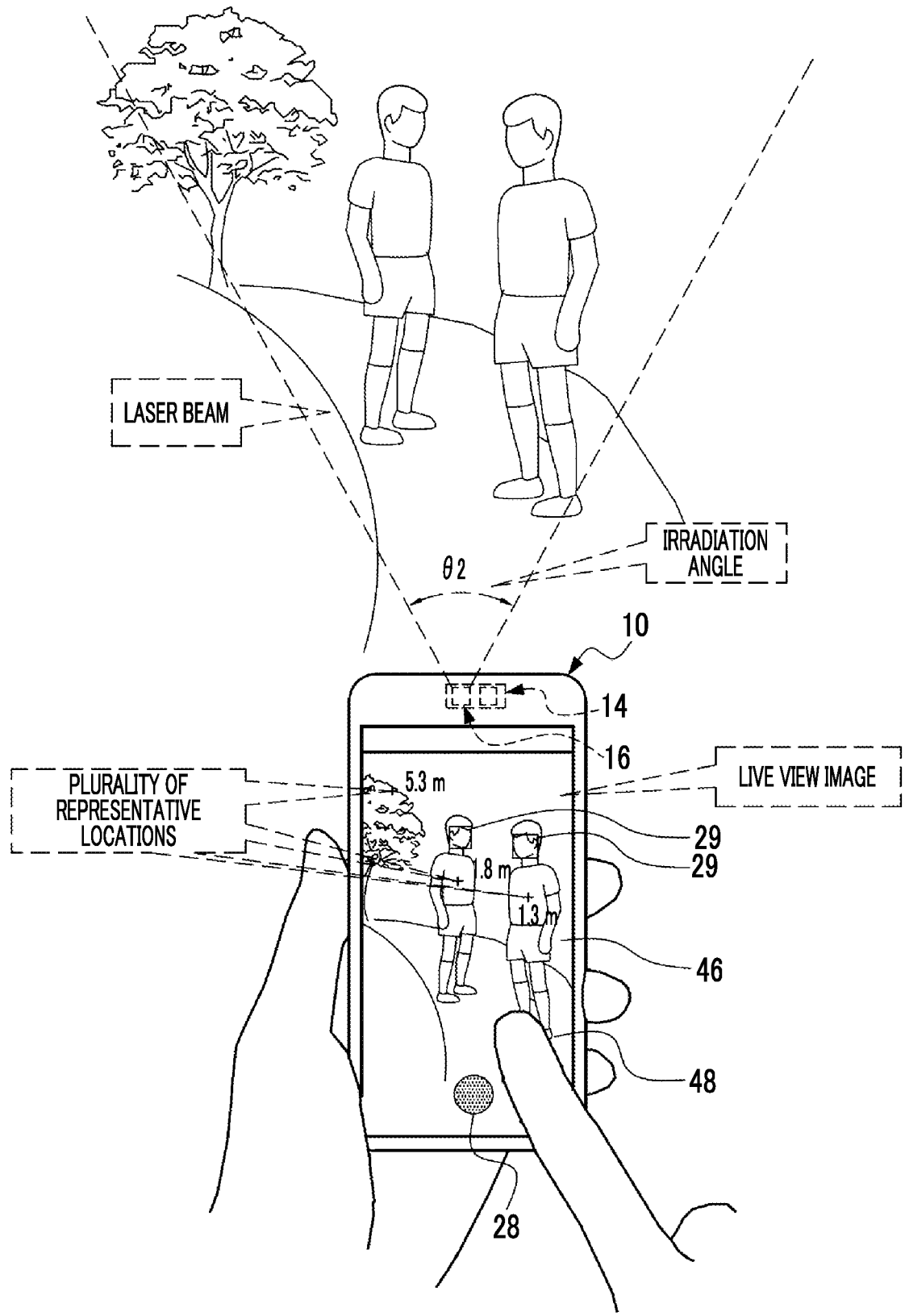
FIG. 6 is a conceptual diagram showing an example of an aspect in which a distance measurement operation and a recognition operation are performed by a distance measurement imaging apparatus provided in the smart device according to the first embodiment and a live view image is displayed on a display.

In addition, the smart device 10 has a distance measurement function. By activating the distance measurement function, as shown in FIG. 6 as an example, the smart device 10 causes the light irradiator 16 to emit the laser beam at an irradiation angle θ2, and receives the IR reflected light by the distance measurement divided region 26N2 of the light receiver 18. The irradiation angle θ2 may be the same as or different from the angle of view θ1. A distance from the smart device 10 to the distance measurement target is measured based on the time required from the emission of the laser beam to the reception of the IR reflected light, and a light speed. For example, in a case in which the distance to the distance measurement target is defined as "L", the light speed is defined as "c", and the time required from the emission of the laser beam by the light irradiator 16 to the reception of the IR reflected light by the distance measurement divided region 26N2 is defined as "t", the distance L is calculated according to the expression "L=c×t×0.5".

The recognition result and the distance measurement result are superimposed on the visible light image. A superimposed image obtained by superimposing the recognition result and the distance measurement result on the visible light image is displayed on the display 46 as a live view image. In the example shown in FIG. 6, an image in which the frame line 29 surrounding the face image is superimposed on the visible light image as the recognition result and a numerical value (in the example shown in FIG. 6, 1.6 m, 1.8 m, and 5.3 m) indicating the distance from the smart device 10 to the distance measurement target is superimposed on the visible light image as the distance measurement result is indicated as the superimposed image, the superimposed image is displayed on the display 46 as the live view image. In addition, in the example shown in FIG. 6, the distance from the smart device 10 to each of a plurality of representative locations (three locations in the example shown in FIG. 6) in the imaging region are superimposed on the visible light image. Examples of the plurality of representative locations include a plurality of locations in which a difference between the contrasts is equal to or more than a predetermined value among specific subjects in the imaging region (for example, a subject included in a center region of the screen and/or a human being).

Figure 7:
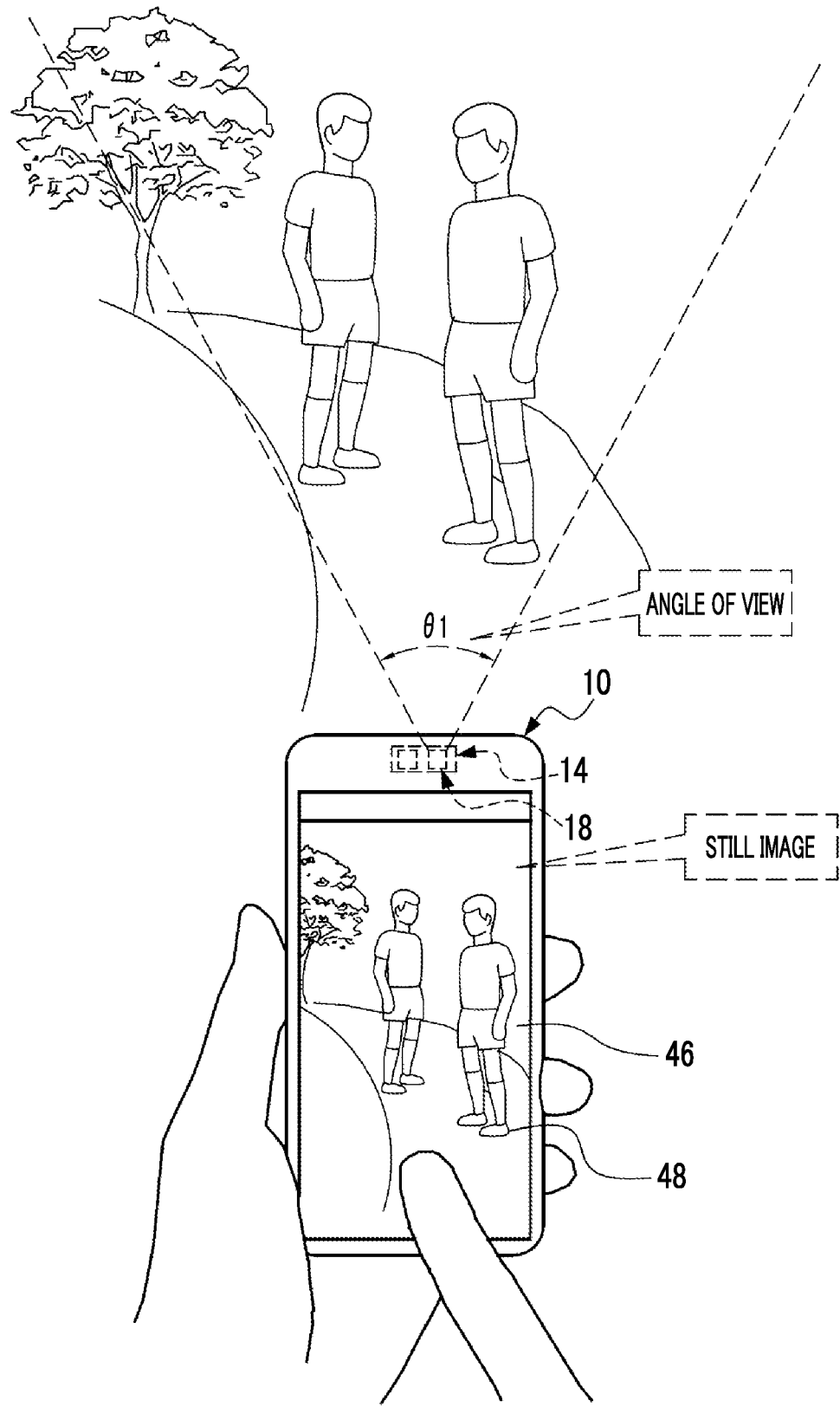
FIG. 7 is a conceptual diagram showing an example of an aspect in which a still image is captured by the smart device according to the first embodiment.

A soft key 28 is displayed on the display 46 together with the live view image. The soft key 28 is operated by the user or the like in a case in which an instruction for starting imaging for a recording image. Examples of the recording image include a still image and/or a moving image. As shown in FIG. 7, the user determines the imaging region while visually recognizing the live view image, and operates the soft key 28. In the smart device 10, in a case in which the soft key 28 is operated by the user, the focus is adjusted according to the recognition result and the distance measurement result, and the imaging for the recording image is performed. Note that, in the following, the exposure performed by imaging for the recording image is also referred to as "main exposure".

A configuration of the smart device 10 will be described with reference to FIG. 8. In addition to the light irradiator 16 and the light receiver 18, the smart device 10 comprises a controller 15, an input and output interface 40, an image memory 42, a UI system device 44, an external I/F 52, and a communication I/F 54. Note that the controller 15 is an example of a "processing apparatus" and a "computer" according to the technology of the present disclosure.

The controller 15 comprises a CPU 15A, a storage 15B, and a memory 15C. The CPU 15A is an example of a "processor" and a "recognition processor" according to the technology of the present disclosure, and the memory 15C is an example of a "memory" according to the technology of the present disclosure. The CPU 15A, the storage 15B, and the memory 15C are connected via a bus 50, and the bus 50 is connected to the input and output interface 40. Note that, in the example shown in FIG. 8, one bus is shown as the bus 50 for convenience of illustration, but a plurality of buses may be used. The bus 50 may be a serial bus, or may be a parallel bus, which includes an information bus, an address bus, a control bus, and the like.

Various parameters and various programs are stored in the storage 15B. The storage 15B is a non-volatile storage device. Here, examples of the storage 15B include a flash memory. The flash memory is merely an example, and examples of the storage 15B include various non-volatile memories, such as a magnetoresistive memory and/or a ferroelectric memory in place of the flash memory or in combination with the flash memory. In addition, the non-volatile storage device may be an EEPROM, an HDD, and/or an SSD. In addition, the memory 15C temporarily stores various pieces of information and is used as a work memory. Examples of the memory 15C include the RAM, but the technology of the present disclosure is not limited to this, and other types of storage devices may be used.

Various programs including an imaging processing program 70 are stored in the storage 15B. The imaging processing program 70 is an example of a "program" according to the technology of the present disclosure. The CPU 15A reads out a necessary program from the storage 15B, and executes the read out program on the memory 15C. The CPU 15A controls the entire smart device 10 according to the program executed on the memory 15C.

A plurality of devices are connected to the input and output interface 40, and the input and output interface 40 controls the exchange of various pieces of information between the plurality of devices. In the example shown in FIG. 8, as the plurality of devices connected to the input and output interface 40, the controller 15, the light irradiator 16, the light receiver 18, the image memory 42, the UI system device 44, the external I/F 52, and the communication I/F 54 are shown.

The external I/F 52 controls the exchange of various pieces of information with and from a device present outside the smart device 10 (hereinafter, also referred to as an "external device"). Examples of the external I/F 52 include a USB interface. The external device (not shown), such as the smart device, a personal computer, a server, a USB memory, a memory card, and/or a printer, can be directly or indirectly connected to the USB interface.

The communication I/F 54 has a communication function, such as LTE, 5G, wireless LAN, and/or Bluetooth (registered trademark), and controls the exchange of various pieces of information between the external device and the CPU 15A. For example, the communication I/F 54 is communicably connected to a network 56 (for example, the Internet) via a base station (not shown), and controls the exchange of various pieces of information between the external device and the CPU 15A on the network 56.

The UI system device 44 comprises the display 46, and the CPU 15A displays various pieces of information on the display 46. In addition, the UI system device 44 comprises a reception device 47. The reception device 47 comprises the touch panel 48 and a hard key unit 53. The hard key unit 53 is at least one hard key including the instruction key 13 (see FIG. 2). The CPU 15A is operated in response to various instructions received by the touch panel 48. Note that although the hard key unit 53 is provided in the UI system device 44 here, the technology of the present disclosure is not limited to this, and for example, the hard key unit 53 may be connected to the external I/F 52.

The light irradiator 16 comprises the light transmitting window 20, a beam expander 21, a collimating lens 23, the LD 24, and an LD driver 25, and the light transmitting window 20, the beam expander 21, the collimating lens 23 are disposed in this order from an imaging region side (object side) to the LD 24 along an optical axis L1. The LD driver 25 is connected to the LD 24 and the input and output interface 40, and drives the LD 24 in response to the instruction of the CPU 15A to emit the laser beam from the LD 24.

The laser beam emitted from the LD 24 is converted into parallel light by the collimating lens 23, then a light diameter thereof is expanded by the beam expander 21, and the laser beam is emitted from the light transmitting window 20 to the distance measurement target.

The light receiver 18 comprises the light transmitting window 22, an objective lens 30A, a focus lens 30B, a stop 30C, the photoelectric conversion element 26, a photoelectric conversion element driver 32, and a signal processing circuit 34. In the light receiver 18, the light transmitting window 22, the objective lens 30A, the focus lens 30B, and the stop 30C are disposed in this order from the imaging region side (object side) to the photoelectric conversion element 26 along an optical axis L2. The photoelectric conversion element driver 32 is connected to the photoelectric conversion element 26 and the input and output interface 40, and drives the photoelectric conversion element 26 in response to the instruction of the CPU 15A. For example, under the control of the CPU 15A, the photoelectric conversion element driver 32 supplies an imaging timing signal defining the timing of imaging performed by the photoelectric conversion element 26 to the photoelectric conversion element 26. The photoelectric conversion element 26 performs resetting, exposure, and output of the electric signal according to the imaging timing signal supplied from the photoelectric conversion element driver 32. Examples of the imaging timing signal include a vertical synchronizing signal and a horizontal synchronizing signal.

The light receiver 18 comprises a focus control mechanism 31. The focus control mechanism 31 comprises a focus lens 30B, a moving mechanism 60, a motor 62, and a motor driver 64. The focus lens 30B is slidably supported along the optical axis L2 by the moving mechanism 60. The motor 62 is connected to the moving mechanism 60 and the motor driver 64. The motor driver 64 is connected to the input and output interface 40, and drives the motor 62 in response to the instruction from the CPU 15A. The moving mechanism 60 is connected to a drive shaft (not shown) of the motor 62, and receives power from the motor 62 to selectively move the focus lens 30B between the object side and an image side along the optical axis L2. That is, the CPU 15A adjusts a focus position by controlling the drive of the motor 62 via the motor driver 64. Here, the "focus position" refers to a position of the focus lens 30B on the optical axis L2 in a state of being focused (for example, a state in which the contrast of the visible light image is maximized or a state in which a predetermined subject depth of field is realized). Hereinafter, for convenience of description, the control of aligning the focus lens 30B with the focus position is also referred to as a "focus control".

The stop 30C is a fixed stop of which an opening is not changed. In a case of a fixed stop, the exposure adjustment is performed by an electronic shutter of the photoelectric conversion element 26. The stop 30C may be a variable stop instead of a fixed stop. Note that the objective lens 30A, the focus lens 30B, and the stop 30C provided in the light receiver 18 are merely examples, and the technology of the present disclosure is established even in a case in which the configuration of the lens and/or the position of the stop 30C are changed.

The reflected light is incident on the light receiver 18 from the light transmitting window 22. The reflected light incident on the light transmitting window 22 is imaged on the photoelectric conversion element 26 via the objective lens 30A, the focus lens 30B, and the stop 30C.

The photoelectric conversion element 26 is connected to the signal processing circuit 34, and outputs, to the signal processing circuit 34, pixel data indicating a pixel value for each pixel of the visible light pixel and the IR pixel. The signal processing circuit 34 digitizes the pixel data by performing A/D conversion on the pixel data input from the photoelectric conversion element 26, and performs various pieces of signal processing on the digitized pixel data.

The signal processing circuit 34 comprises a visible light pixel data processing circuit 34A and an IR pixel data processing circuit 34B. The visible light pixel data processing circuit 34A generates the visible light image by performing known signal processing, such as white balance adjustment, sharpness adjustment, gamma correction, color space conversion processing, and color difference correction on the pixel data of the visible light pixel. Moreover, the visible light pixel data processing circuit 34A stores the visible light image in the image memory 42. Note that, as described below, 10 frames of the visible light image that are sequentially captured while gradually changing the intensity of the laser beam for distance measurement are stored in the image memory 42.

In the distance measurement divided region 26N2, the IR reflected light is received by the IR pixel, and is used for measuring the distance from the smart device 10 to the distance measurement target based on the emission timing and the light reception timing. The IR pixel data processing circuit 34B acquires an emission timing signal indicating a timing at which the laser beam is emitted from the LD 24 from the CPU 15A (hereinafter, also referred to as "emission timing"). The IR pixel data processing circuit 34B measures the distance from the smart device 10 to the distance measurement target for each IR pixel based on the emission timing indicated by the emission timing signal, and timing at which the IR reflected light is received by each IR pixel (hereinafter, also referred to as "light reception timing"). Moreover, the IR pixel data processing circuit 34B stores the distance measurement result including the measured distance and the visible light image in the image memory 42 in association with each other.

By the way, in a case in which the smart device 10 performs the image recognition on the visible light image obtained by performing imaging on a paper on which the person is drawn as the subject, the smart device 10 may erroneously determine the subject as a "person". However, by performing the image recognition using the distance measurement result obtained by performing the distance measurement in a depth direction of the subject, the smart device 10 can determine whether the subject is the "paper on which the person is drawn" or the "person". That is, the smart device 10 can improve the accuracy of the image recognition by performing the image recognition using the distance measurement result. The image recognition is performed on the visible light image generated by the visible light pixel data processing circuit 34A based on the light reception result in the visible light image divided region 26N1. Ideally, the IR reflected light is completely cut by the visible light filter in the visible light image divided region 26N1. However, it is difficult to completely cut the IR reflected light by the visible light filter depending on the intensity of the IR reflected light. In a case in which the IR reflected light reaches the visible light pixel, the IR reflected light may be reflected in the visible light image as noise. In a case in which the image recognition is performed on the visible light image, in a case in which an image quality of the visible light image deteriorates, the accuracy of the image recognition deteriorates. For example, in a case in which the intensity of the laser beam of the LD 24 is set to zero, the IR reflected light also becomes zero, so that the IR reflected light is not reflected in the visible light image as noise, but the distance measurement cannot be performed. In a case in which the distance measurement becomes impossible, the distance measurement result cannot be used for the image recognition, so that the accuracy of the image recognition is decreased as compared to a case in which the distance measurement result is used for the image recognition.

Figure 9:
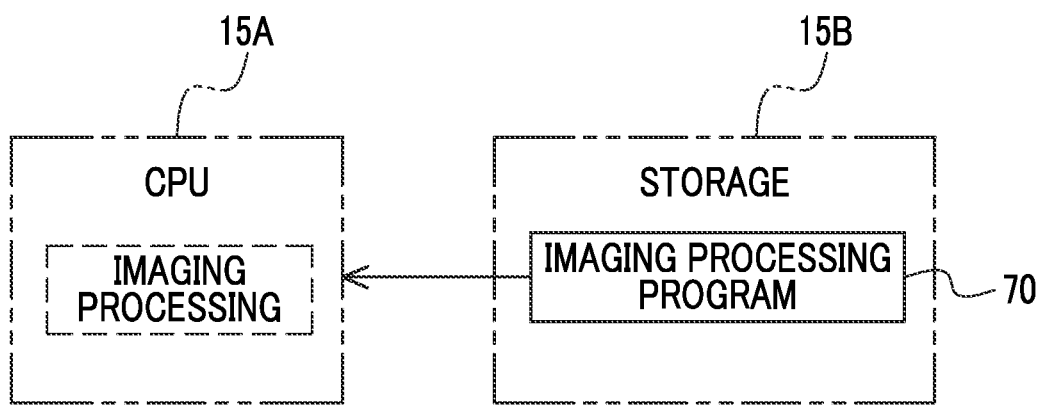
FIG. 9 is a conceptual diagram showing an example of reading an imaging processing program in a case in which imaging processing is executed by a CPU provided in the smart device according to the first embodiment.

Therefore, in the smart device 10, as shown in FIG. 9 as an example, the CPU 15A reads out the imaging processing program 70 from the storage 15B, and executes the imaging processing according to the read out imaging processing program.

Figure 10:
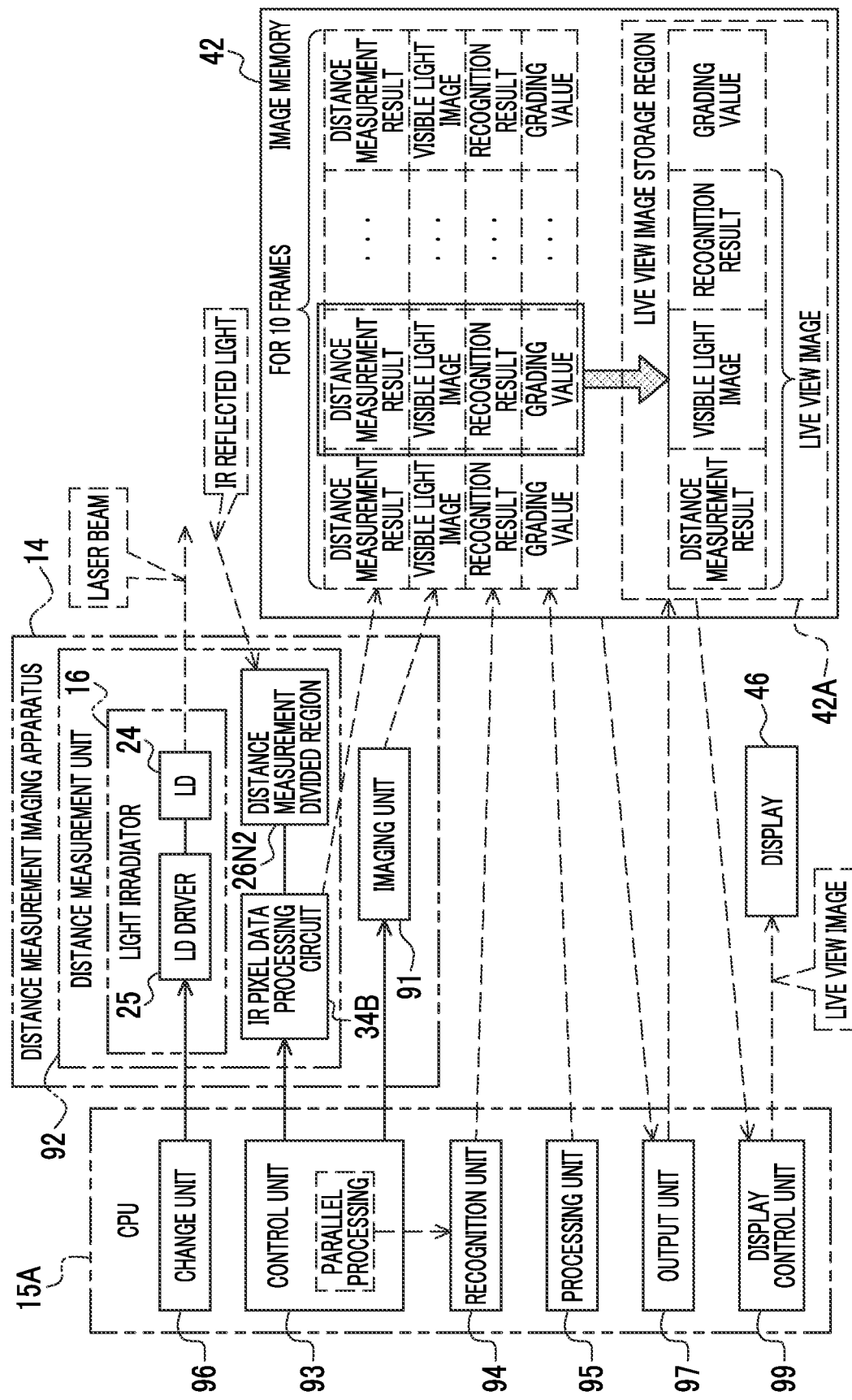
FIG. 10 is a functional block diagram showing an example of functions of the CPU and the distance measurement imaging apparatus in a case in which the imaging processing is performed by the CPU provided in the smart device according to the first embodiment.

As shown in FIG. 10 as an example, the imaging processing is realized by the distance measurement imaging apparatus 14 being operated as an imaging unit 91 and a distance measurement unit 92, and the CPU 15A being operated as a change unit 96, a control unit 93, a recognition unit 94, a processing unit 95, an output unit 97, and a display control unit 99. The imaging unit 91 comprises the light receiver 18, and the distance measurement unit 92 comprises the light irradiator 16, the distance measurement divided region 26N2 (see FIGS. 3 and 8), the IR pixel data processing circuit 34B, and the like.

The change unit 96 changes the irradiation energy of the laser beam (hereinafter, also simply referred to as "irradiation energy") in multi-stage. In the present embodiment, 10 stages are adopted as an example of the "multi-stage". The change unit 96 changes the irradiation energy by changing the intensity of the laser beam emitted from the LD 24 via the LD driver 25. In a state in which the irradiation energy is the lowest, the irradiation energy may be zero. The laser beam is emitted in synchronization with imaging of the visible light image. Here, the aspect example has been described in which the intensity of the laser beam is changed by the change unit 96, but the technology of the present disclosure is not limited to this. For example, the irradiation energy of the laser beam may be changed by changing the emission time of the laser beam and/or the number of times of emission of the laser beam per unit time together with the intensity of the laser beam or instead of the intensity of the laser beam.

The control unit 93 causes the imaging unit 91 to image the imaging region at a predetermined frame rate (for example, 120 fps). The visible light image obtained by being captured by the imaging unit 91 is stored in the image memory 42. In addition, the control unit 93 performs continuous parallel processing. The continuous parallel processing refers to parallel processing a plurality of times. Here, a plurality of times means 10 times. 10 times refers to, for example, 10 frames of imaging performed by the imaging unit 91. In addition, the parallel processing refers to processing of causing the recognition unit 94 and the distance measurement unit 92 to perform the recognition operation and the distance measurement operation in parallel. The recognition operation is performed by the recognition unit 94, and the distance measurement operation is performed by the distance measurement unit 92. That is, the control unit 93 controls the recognition unit 94 and the distance measurement unit 92 such that the recognition operation and the distance measurement operation are performed in parallel for 10 frames.

Note that, here, the aspect example has been described in which the recognition operation and the distance measurement operation are performed in parallel for 10 frames, but the technology of the present disclosure is not limited to this, the recognition operation and the distance measurement operation may be performed in parallel for less than 10 frames or equal to or more than 11 frames, and the recognition operation and the distance measurement operation need only be performed in parallel a plurality of times. The number of times the recognition operation and the distance measurement operation are performed in parallel may be a fixed value, a value changed in response to an instruction received by the reception device 47, or a value changed according to an operation mode and/or the imaging scene of the smart device 10.

In addition, in the present embodiment, the continuous parallel processing is repeatedly performed. That is, the processing of performing the recognition operation and the distance measurement operation in parallel for 10 frames is repeatedly performed a plurality of times. In the present embodiment, the number of times the continuous parallel processing is repeatedly performed is several tens (for example, 30 times) or more. The number of times the continuous parallel processing is repeatedly performed may be a fixed value, a value changed in response to an instruction received by the reception device 47, or a value changed according to an operation mode and/or the imaging scene of the smart device 10.

In the IR pixel data processing circuit 34B, the distance from the smart device 10 to the distance measurement target is measured for each IR pixel based on the time required from the emission of the laser beam by the light irradiator 16 to the reception of the IR reflected light by the distance measurement divided region 26N2 (see FIGS. 3 and 8), and the light speed. In this time, depending on the irradiation energy of the laser beam and the distance to the distance measurement target, the IR pixel that cannot sufficiently receive the IR reflected light is generated. Here, the "IR pixel that cannot sufficiently receive the IR reflected light" refers to, for example, the IR pixel in which the light reception amount of the IR reflected light from the distance measurement target several meters away is less than the light reception amount, which is derived in advance by a test with an actual machine and/or a computer simulation as the light reception amount at which the distance measurement can be performed. Generally, as the irradiation energy of the laser beam is higher, the measurable distance is longer, and as the irradiation energy is weaker, the measurable distance is shorter. The IR pixel data processing circuit 34B has a threshold value used for comparison with the light reception amount of the IR reflected light by each IR pixel (for example, the light reception amount per unit time), and outputs blank information indicating that the distance measurement cannot be correctly performed for the IR pixel in which the light reception amount of the IR reflected light is less than the threshold value. The distance measurement result for one frame by the distance measurement unit 92 is stored in the image memory 42 in association with the visible light image and.

The distance measurement result includes the distance measured by the distance measurement unit 92, that is, the distance from the smart device 10 to the distance measurement target, the number of IR pixels (hereinafter, also referred to as "the number of correct distance measurement IR pixels") in which the distance measurement is correctly performed (hereinafter, also referred to as a "correct distance measurement IR pixel"), and the blank information. The number of correct distance measurement IR pixels is calculated by the IR pixel data processing circuit 34B. The correct distance measurement IR pixel is, for example, the IR pixel that receives the IR reflected light having the light reception amount equal to or more than a threshold value, and is generally increased as the irradiation energy of the laser beam is increased. On the contrary, in a case in which the irradiation energy of the laser beam is high, the light amount of the laser beam reflected in the visible light image is increased and the image quality deteriorates. Therefore, as the irradiation energy of the laser beam is higher, the number of face images is smaller.

The recognition unit 94 reads out the visible light image from the image memory 42, and performs the image recognition on the face image with reference to an image recognition dictionary (not shown) for the read out visible light image. For example, in the image recognition dictionary, a plurality of types of face images are registered. The recognition result for one frame obtained by performing the image recognition is stored in association with the visible light image and the distance measurement result in the image memory 42.

The processing unit 95 reads out the distance measurement result and the recognition result for one frame from the image memory 42. Moreover, the processing unit 95 performs grading processing. Here, the grading processing refers to processing of grading a corresponding frame for each frame (here, as an example, for each of 10 frames) according to the number of IR pixels and the number of face images included in the read out distance measurement result. Grading each frame refers to that the recognition result corresponding to each frame is weighted. Note that the number of face images is an example of a "plurality of recognition results obtained by the recognition operation a plurality of times" according to the technology of the present disclosure. In addition, the grading processing is an example of "specific processing" according to the technology of the present disclosure. In addition, in the following, for convenience of description, one frame to be graded is also referred to as a "grading target frame".

The grading processing is executed by the processing unit 95 according to Calculation Expression (1). Specifically, as shown in Calculation Expression (1), the processing unit 95 calculates, as a grading value, the sum of a value obtained by multiplying the number of correct distance measurement IR pixels by a coefficient A, and a value obtained by multiplying the number of face images by a coefficient B different from the coefficient A. Here, as the coefficients A and B, positive values are adopted.

$$\text{Grading value} = \text{(the number of correct distance measurement } IR \text{ pixels)} \times A + \text{(the number of face images)} \times B \qquad (1)$$

Note that, in Calculation Expression (1), the coefficients A and B do not have to be positive values. For example, in a case in which the grading value ignoring the distance measurement result is obtained, the coefficient A need only be set to "0", and in a case in which the grading value ignoring the recognition result is obtained, the coefficient B need only be set to "0". In addition, the coefficient A may be determined according to the irradiation energy. For example, in a case in which the irradiation energy is "0", the coefficient A may be set to "0", and the value of the coefficient A may be larger as the irradiation energy is higher. As a result, the grading value is calculated as a value corresponding to the irradiation energy used in the distance measurement operation parallel to the recognition operation. In addition, the coefficient A and/or the coefficient B may be a fixed value, a value changed in response to an instruction received by the reception device 47, or a value changed according to an operation mode and/or the imaging scene of the smart device 10.

According to Calculation Expression (1), as the number of correct distance measurement IR pixels is larger and the number of face images is larger, the grading value is higher. The grading value is stored in the image memory 42 in association with the visible light image, the distance measurement result, and the recognition result.

The image memory 42 stores 10 frames of the visible light image that are sequentially captured while changing an irradiation energy level R of the laser beam in 10 stages from 1 to 10, the distance measurement result, the recognition result, and the grading value.

The output unit 97 outputs the recognition result and the distance measurement result for a specific frame among the plurality of frames obtained by imaging the imaging region by the imaging unit 91 a plurality of times according to the predetermined frame rate. Specifically, the output unit 97 outputs the visible light image, the distance measurement result, and the recognition result of the frame having the highest grading value among the 10 frames to a live view image storage region 42A of the image memory 42 with reference to the grading values for 10 frames. Note that the frame having the highest grading value among 10 frames is an example of a "specific time among the plurality of times" according to the technology of the present disclosure, and the live view image storage region 42A is an example of a "specific output destination" according to the technology of the present disclosure.

The display control unit 99 acquires the visible light image, the distance measurement result, and the recognition result from the live view image storage region 42A, and generates the superimposed image based on the acquired visible light image, distance measurement result, and recognition result. The display control unit 99 outputs the generated superimposed image as the live view image to the display 46 and causes the display 46 to display the live view image (see FIG. 6). Note that the output unit 97 and the display control unit 99 are examples of an "output unit" according to the technology of the present disclosure. In addition, the display 46 is an example of a "specific output destination" and a "display unit" according to the technology of the present disclosure.

Note that, here, the image obtained by superimposing both the distance measurement result and the frame line 29 on the visible light image has been described as an example of the superimposed image, but the technology of the present disclosure is not limited to this, and an image obtained by superimposing only any one of the distance measurement result or the frame line 29 on the visible light image may be adopted. In addition, the superimposed image and the visible light image may be selectively displayed on the display 46 as the live view image.

Then, the operation of the portion of the smart device 10 according to the technology of the present disclosure will be described with reference to FIG. 11. Note that, in FIG. 11, an example of a flow of the imaging processing executed by the CPU 15A is shown.

In the imaging processing shown in FIG. 11, first, in step ST10, the control unit 93 determines whether or not a condition for starting the imaging processing (hereinafter, also referred to as a "imaging processing start condition") is satisfied. Examples of the imaging processing start condition include a condition that an instruction for starting the imaging processing is received by touch panel 48. In a case in which the imaging processing start condition is not satisfied in step ST10, the determination in step ST10 is made again. In a case in which the imaging processing start condition is satisfied in step ST10, the imaging processing proceeds to step ST12.

In step ST12, the change unit 96 sets the irradiation energy level R of the laser beam to a maximum value 10. Thereafter, the imaging processing proceeds to step ST14.

In step ST14, the control unit 93 determines whether or not the imaging timing has arrived. The imaging timing arrives, for example, for each period (for example, ¹⁄₁₂₀ seconds) defined at the predetermined frame rate. In a case in which the imaging timing has not arrived in step ST14, a negative determination is made, and the determination in step ST14 is made again. In a case in which the imaging timing has arrived in step ST14, a positive determination is made, and the imaging processing proceeds to step ST16.

In step ST16, the control unit 93 causes the photoelectric conversion element 26 to perform exposure by controlling the imaging unit 91. That is, the control unit 93 resets the photoelectric conversion element 26 and causes the photoelectric conversion element 26 to accumulate a new electric charge by causing the photoelectric conversion element driver 32 to output the imaging timing signal to the photoelectric conversion element 26. Moreover, the control unit 93 causes the visible light pixel data processing circuit 34A to generate the visible light image according to an amount of electric charge accumulated in the photoelectric conversion element 26. The visible light image obtained by exposure by the photoelectric conversion element 26 is stored in the image memory 42. In addition, the control unit 93 controls the distance measurement unit 92 to emit the laser beam. Thereafter, the imaging processing proceeds to step ST18.

In step ST18, the control unit 93 performs the parallel processing. That is, in step ST18, the distance measurement operation is performed by the distance measurement unit 92, and the recognition operation is performed by the recognition unit 94. The distance measurement unit 92 measures the distance from the smart device 10 to the distance measurement target for each IR pixel. The recognition unit 94 reads out the visible light image from the image memory 42, and performs the image recognition on the face image of the read out visible light image. The distance measurement result and the recognition result for one frame obtained here are stored, by the control unit 93, in the image memory 42 in association with the visible light image. Thereafter, the imaging processing proceeds to step ST20.

In step ST20, the processing unit 95 reads out the distance measurement result and the recognition result of the grading target frame from the image memory 42, and calculates the grading values of the distance measurement result and the recognition result in the grading target frame according to the number of correct distance measurement IR pixels and the number of face images. The grading value is stored in the image memory 42 in association with the visible light image, the distance measurement result, and the recognition result for the grading target frame. Thereafter, the imaging processing proceeds to step ST22.

In step ST22, the processing unit 95 determines whether or not the irradiation energy level R of the laser beam is equal to a minimum value 1. In a case in which R=1 is not satisfied in step ST22, a negative determination is made, and the imaging processing proceeds to step ST23. In a case in which R=1 is satisfied in step ST22, a positive determination is made, and the imaging processing proceeds to step ST24.

In step ST23, the processing unit 95 subtracts "1" from the irradiation energy level R. Thereafter, the imaging processing proceeds to step ST14.

By repeating the processing from step ST14 to step ST20 as described above, the irradiation energy level R is decreased one by one from the maximum value 10 to the minimum value 1, and thus the irradiation energy level R is changed in 10 stages. The visible light image obtained by sequentially imaging the imaging region by the imaging unit 91 as the irradiation energy level R is changed step by step, the distance measurement result by the distance measurement unit 92, the recognition result by the recognition unit 94, and the grading value calculated by the processing unit 95 for 10 frames are stored in the image memory 42.

In step ST24, the output unit 97 outputs the visible light image, the distance measurement result, and the recognition result of the frame having the highest grading to the live view image storage region 42A of the image memory 42 with reference to the grading values for 10 frames. Thereafter, the imaging processing proceeds to step ST26.

In step ST26, the display control unit 99 acquires the visible light image, the distance measurement result, and the recognition result of the frame having the highest grading value from the live view image storage region 42A. Moreover, the display control unit 99 generates the superimposed image from the visible light image, the distance measurement result, and the recognition result of the frame having the highest grading value acquired from the live view image storage region 42A, and causes the display 46 to display the generated superimposed image as the live view image. As a result, among the distance measurement results and recognition results for 10 frames acquired while changing the irradiation energy level R in 10 stages, the live view image generated by using the distance measurement result and the recognition result of the frame having the highest overall accuracy of the distance measurement operation and the recognition operation is displayed on the display 46. Thereafter, the imaging processing proceeds to step ST28.

In step ST28, the control unit 93 determines whether or not the soft key 28 (see FIG. 6) is operated by the user. In a case in which the soft key 28 is not operated in step ST28, a negative determination is made, and the imaging processing proceeds to step ST32. In a case in which the soft key 28 is operated in step ST28, a positive determination is made, and the imaging processing proceeds to step ST30.

In step ST30, the control unit 93 causes the imaging unit 91 to perform imaging for a still image accompanied by the main exposure based on the distance measurement result and the recognition result of the frame having the highest grading value used in the live view image. Thereafter, the imaging processing proceeds to step ST32. Note that, here, imaging for the still image has been described as an example, but the technology of the present disclosure is not limited to this, imaging for a moving image accompanied by the main exposure may be adopted, and the imaging need only be imaging for the recording image described above.

In the imaging for the still image by the imaging unit 91 in step ST30, focusing is performed on the face of the person indicated by a specific face image based on the distance measurement result and the recognition result of the frame having the highest grading value used in the live view image. Here, the specific face image is, for example, the face image included in the recognition result. In a case in which the recognition result includes a plurality of the face images, the face of the person closest to the center of the imaging region, or the face of the person having a specific facial expression (for example, a smile) among the faces of the plurality of persons indicated by the plurality of face images is selected as a focusing target. In addition, among the faces of the plurality of persons displayed on the display 46 surrounded by the frame line 29, the face of the person designated by the user or the like via the touch panel 48 may be selected as the focusing target as the region to be focused.

The control unit 93 acquires the distance to the face of the person selected as the focusing target from the distance measurement result, and derives a focus position corresponding to the acquired distance. The focus position is derived by the control unit 93 from, for example, a focus position derivation table (not shown) in which the distance and the focus position are associated with each other, or a focus position derivation arithmetic expression (not shown) in which the distance is an independent variable and the focus position is a dependent variable. The control unit 93 operates the focus control mechanism 31 to move the focus lens 30B to the derived focus position. Moreover, the control unit 93 drives the photoelectric conversion element driver 32 to cause the photoelectric conversion element 26 to perform the main exposure. By performing the main exposure, the still image is generated by the visible light pixel data processing circuit 34A, and the generated still image is stored in the image memory 42 by the visible light pixel data processing circuit 34A. Moreover, the control unit 93 acquires the still image from the image memory 42, and stores the acquired still image in a memory card (not shown) connected to the external I/F 52.

In step ST32, the control unit 93 determines whether or not a condition for terminating the imaging processing (hereinafter, also referred to as an "imaging processing termination condition") is satisfied. Examples of the imaging processing termination condition include a condition that an instruction for terminating the imaging processing is received by touch panel 48. In a case in which the imaging processing termination condition is not satisfied in step ST36, a negative determination is made, and the imaging processing proceeds to step ST12. In a case in which the imaging processing termination condition is satisfied in step ST36, a positive determination is made, and the imaging processing is terminated.

As described above, with the smart device 10 according to the first embodiment, the control unit 93 performs, a plurality of times in parallel, the recognition operation in which the recognition unit 94 recognizes the specific subject (here, as an example, the face of the person) included in the imaging region based on the visible light image obtained by imaging the imaging region by the imaging unit 91, and the distance measurement operation in which the distance measurement unit 92 performs the distance measurement by emitting the laser beam to the imaging region and receiving the IR reflected light of the laser beam from the imaging region. The change unit 96 changes the irradiation energy of the laser beam to the imaging region for each distance measurement operation. Therefore, with this configuration, it is possible to achieve both the distance measurement and the recognition of the specific subject with high accuracy as compared to a case in which the image recognition of the specific subject is performed while performing the distance measurement by using the laser beam, which always has the same irradiation energy. Note that, as an example of "changing the irradiation energy of the laser beam to the imaging region for each distance measurement operation" according to the technology of the present disclosure, an aspect has been described in which the irradiation energy of the laser beam is changed for each of all the distance measurement operations, but the technology of the present disclosure is not limited to this. For example, "changing the irradiation energy of the laser beam to the imaging region for each distance measurement operation" also includes a case in which the irradiation energy of the laser beam is the same in a part of continuous or non-continuous times of the plurality of distance measurement operations. As for the plurality of frames including the distance measurement operation in which the irradiation energy of the laser beam is the same, any one of the frames may only be the grading target frame, or all the frames may be the grading target frames.

With the smart device 10 according to the first embodiment, the output unit 97 outputs the recognition result and the distance measurement result for the frame having the highest grading value to the specific output destination (here, for example, the live view image storage region 42A and the display 46). Therefore, with this configuration, it is possible to easily specify the timing at which the recognition result and the distance measurement result are obtained, as compared to a case in which the recognition result and the distance measurement result are output at different timings.

With the smart device 10 according to the first embodiment, the specific output destination is the display 46 capable of displaying at least one of the recognition result or the distance measurement result. Therefore, with this configuration, it is possible for the user to perceive the recognition result obtained by the recognition operation and the distance measurement result obtained by the distance measurement operation.

With the smart device 10 according to the first embodiment, the display 46 displays the specific subject image showing the specific subject and the frame line 29 surrounding the specific subject image as the recognition result. Therefore, with this configuration, it is possible for the user to visually grasp the recognition result obtained by the recognition operation.

With the smart device 10 according to the first embodiment, the control unit 93 moves the focus lens 30B to the focus position determined according to the distance measurement result. Therefore, with this configuration, it is possible to easily focus by an autofocus method as compared to a case of focusing by a manual focus method independently of the distance measurement result.

With the smart device 10 according to the first embodiment, the processing unit 95 calculates 10 grading values from the recognition result and the distance measurement result obtained by the recognition operation and the distance measurement operation 10 times. Therefore, with this configuration, it is possible to specify a well-balanced combination as a combination of the recognition result and the distance measurement result, as compared to a case in which the grading value is not calculated.

With the smart device 10 according to the first embodiment, the recognition result obtained by the recognition operation is weighted depending on the type and/or the aspect of the specific subject. Therefore, with this configuration, it is possible to specify a degree of importance of the recognition result.

With the smart device 10 according to the first embodiment, the control unit 93 causes the imaging unit 91 to perform imaging by the main exposure based on the recognition result selected according to the grading value. Therefore, with this configuration, it is possible to suppress the imaging unit 91 from performing imaging by the main exposure based on the inappropriate recognition result, as compared to a case in which the imaging unit 91 is caused to perform imaging by the main exposure based on the recognition result randomly selected from the plurality of recognition results obtained by the recognition operations plurality of times.

With the smart device 10 according to the first embodiment, the specific subject is the face of the person. Therefore, with this configuration, it is possible to achieve both the distance measurement and the recognition of the face of the person with high accuracy, as compared to a case in which the distance measurement based on the directional light beam, which is always emitted at the same irradiation energy to the imaging region, and the recognition of the face included in the imaging region are performed at the same time.

With the smart device 10 according to the first embodiment, the face of the person may be the face having the specific facial expression. In this case, it is possible to achieve both the distance measurement and the recognition of the face having the specific facial expression with high accuracy, as compared to a case in which the distance measurement based on the laser beam, which is always emitted at the same irradiation energy to the imaging region, and the recognition of the face having the specific facial expression included in the imaging region are performed at the same time.

Note that, in the first embodiment, examples of a "specific subject" according to the technology of the present disclosure include the face of the person, but the technology of the present disclosure is not limited to this. For example, the specific subject may be an object having a reflectivity of less than a threshold value. Here, the threshold value is, for example, a value, which is derived in advance by a sensory test by an actual machine and/or a computer simulation, as a lower limit value of a reflectivity at which the IR reflected light obtained by emitting the laser beam at the predetermined irradiation energy level R appears at a level that is visually recognized as noise in the visible light image. The predetermined irradiation energy level R refers to, for example, the fifth stage irradiation energy level R of the 10 stages of the irradiation energy level R. Therefore, with this configuration, it is possible to achieve both the distance measurement and the recognition of the object having the reflectivity less than the threshold value with high accuracy, as compared to a case in which the distance measurement based on the laser beam, which is always emitted at the same irradiation energy to the imaging region, and the recognition of the object having the reflectivity less than the threshold value are performed at the same time.

In addition, in the first embodiment, the grading processing is mentioned as an example of "specific processing" according to the technology of the present disclosure, but the technology of the present disclosure is not limited to this. For example, processing of outputting at least the recognition result among the recognition result obtained for each recognition operation and the distance measurement result obtained for each distance measurement operation to an external device (not shown), such as a smart device different from the smart device 10, a personal computer, and/or a server via the external I/F 52 may be performed by the processing unit 95. In addition, processing of creating at least the recognition result among the recognition result obtained for each recognition operation and the distance measurement result obtained for each distance measurement operation, and the visible light image as an image file in a specific format type (for example, Exif format type) may be performed by the processing unit 95.

In addition, in the first embodiment, the recognition unit 94 recognizes the face of the person as the specific subject, but the specific subject is not limited to the face of the person, but may be the whole body of the person, or the face having the specific facial expression (for example, a smile) among the faces of the plurality of persons. The recognition unit 94 may recognize a tree, a flower, a historical building, and/or text as the specific subject. In addition, in a case in which the subject includes an object generally recognized as having high reflectivity (for example, a mirror), the object generally recognized as having high reflectivity is likely to reflect the laser beam and appear as noise in the visible light image as compared with an object that absorbs light, such as a black object, and thus the recognition unit 94 may recognize only the object having the reflectivity less than the threshold value described above as the specific subject.

The recognition unit 94 may weight the specific subject depending on the type or the aspect of the specific subject. For example, in a case in which the recognition unit 94 weights the face of the person registered in advance and performs the main exposure based on the recognition result, even in a case in which the person registered in advance is not present at the center of the imaging region, an image focusing on the person is captured. In addition, in a case in which the recognition unit 94 weights an unusual facial expression or movement of an animal, it becomes easy to focus on the unusual facial expression or movement. On the other hand, in a case in which the recognition unit 94 sets the weight of the facial expression with the eyes closed to zero, it becomes difficult to focus on the person with the eyes closed.

In addition, in the first embodiment, the aspect example has been described in which the recognition result and the distance measurement result for the frame having the highest grading value (an example of "specific time" according to the technology of the present disclosure) are output to the specific output destination (for example, the live view image storage region 42A and the display 46), but the technology of the present disclosure is not limited to this. For example, in continuous parallel processing, the recognition result and the distance measurement result for each frame of the first frame, the tenth frame, and the frame having the highest grading value may be output to the specific output destination. In addition, since the continuous parallel processing is repeatedly performed, in the continuous parallel processing selected periodically or non-periodically, the recognition result and the distance measurement result for at least one or more specific frames among 10 frames may be output to the specific output destination.

Second Embodiment

Figure 12:
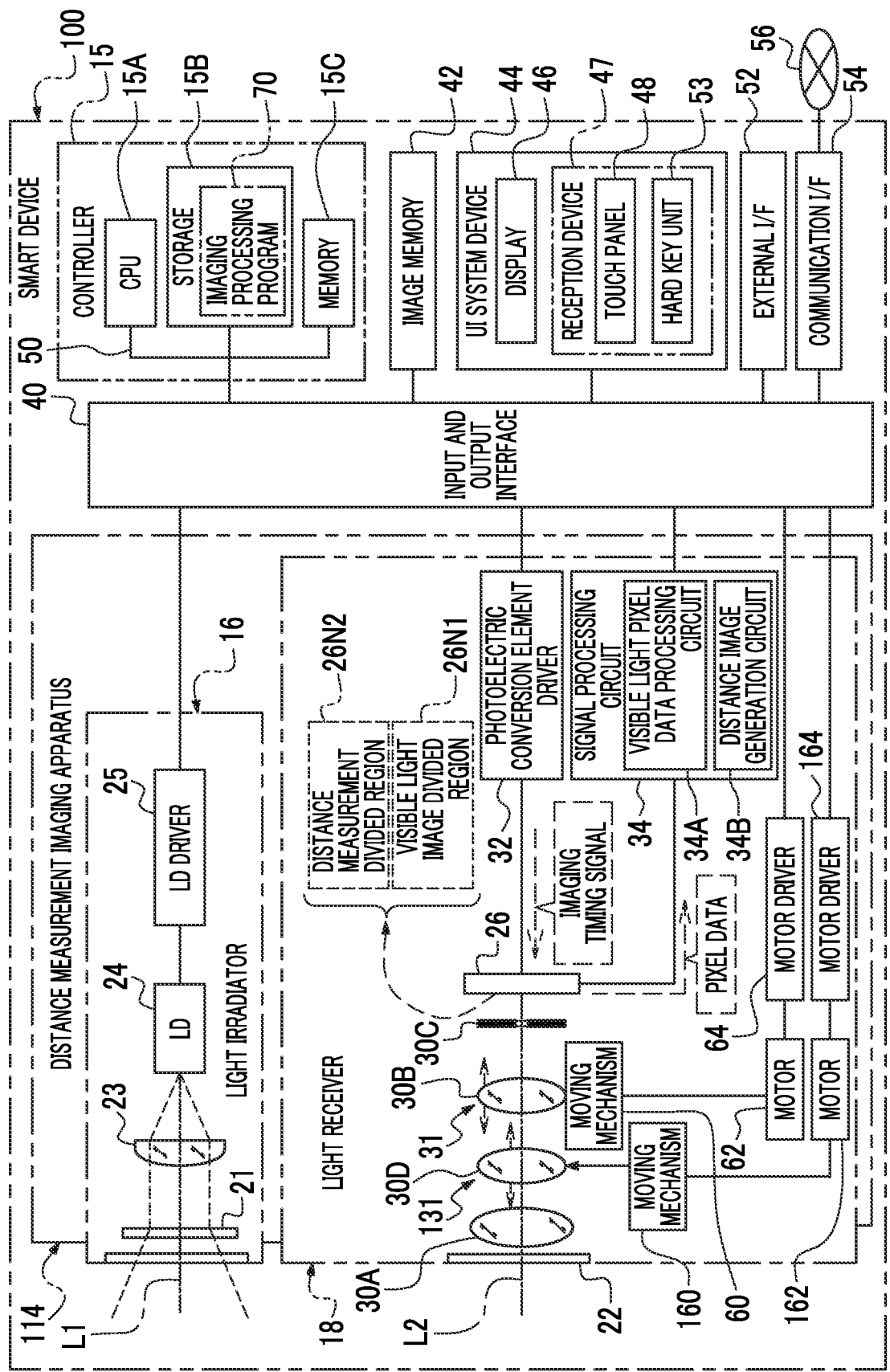
FIG. 12 is a block diagram showing an example of a hardware configuration of an electric system of the smart device according to a second embodiment.

As shown in FIG. 12 as an example, a smart device 100 according to a second embodiment is different from the smart device 10 according to the first embodiment in that a zoom control mechanism 131 is provided. Since the other configurations of the smart device 100 are the same as the configurations of the smart device 10 according to the first embodiment, the same components as the components described in the first embodiment are designated by the same reference numerals, and the description thereof will be omitted.

The smart device 100 is different from the smart device 10 described in the embodiment described above in that a distance measurement imaging apparatus 114 is provided instead of the distance measurement imaging apparatus 14. The distance measurement imaging apparatus 114 is different from the distance measurement imaging apparatus 14 in that a zoom control mechanism 131 is provided. The zoom control mechanism 131 comprises a zoom lens 30D, a moving mechanism 160, a motor 162, and a motor driver 164. The zoom lens 30D is slidably supported along the optical axis L2 by the moving mechanism 160. The motor 162 is connected to the moving mechanism 160 and the motor driver 164. The motor driver 164 is connected to the input and output interface 40, and drives the motor 162 in response to the instruction from the CPU 15A. The moving mechanism 160 is connected to a drive shaft (not shown) of the motor 162, and receives power from the motor 162 to selectively move the zoom lens 30D between the object side and an image side along the optical axis L2. That is, the CPU 15A adjusts the angle of view of imaging by controlling the drive of the motor 162 via the motor driver 164.

Figure 13:
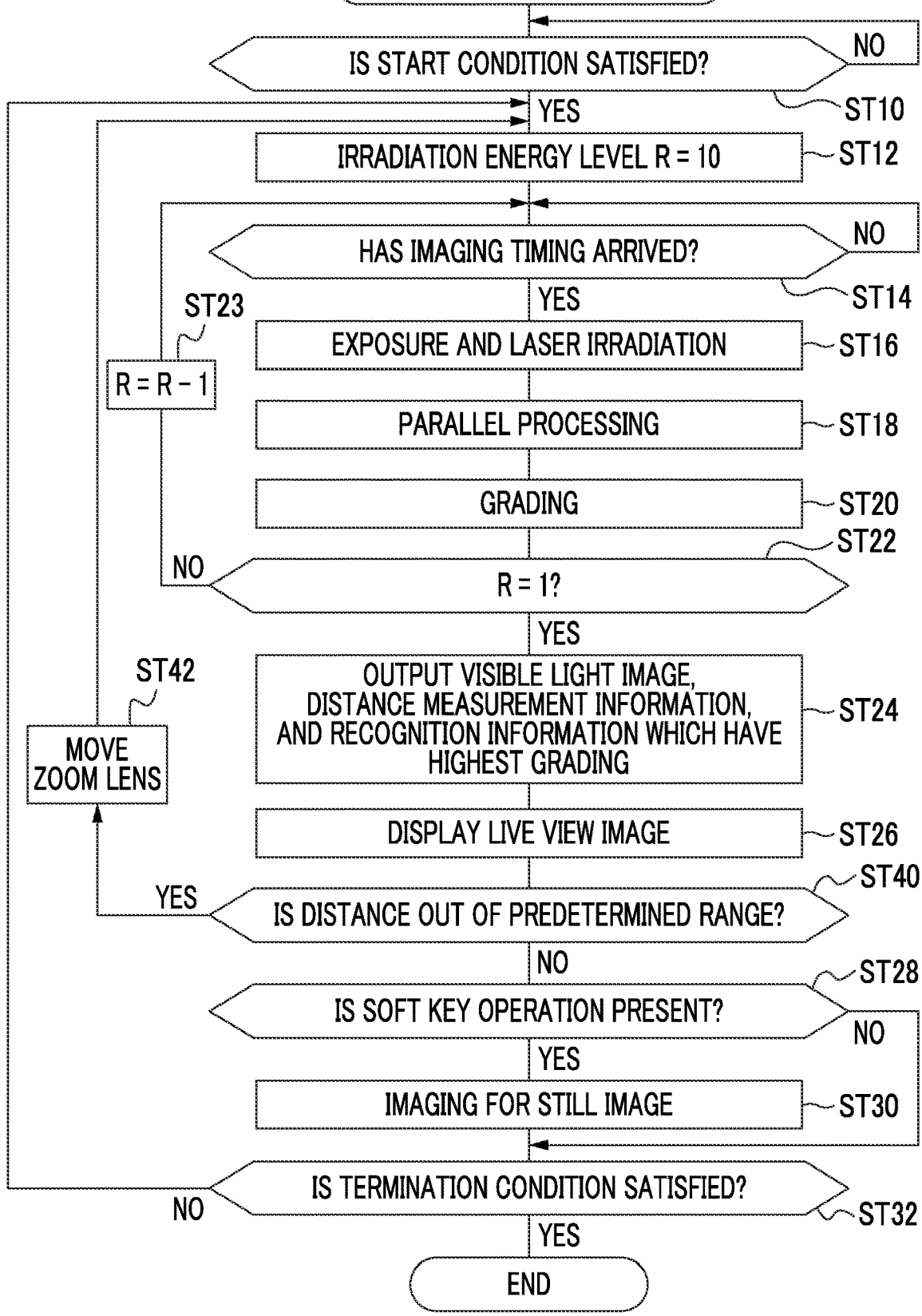
FIG. 13 is a flowchart showing an example of a flow of imaging processing according to the second embodiment.

Then, the imaging processing according to the second embodiment will be described with reference to FIG. 13. The imaging processing shown in FIG. 13 is different from the imaging processing shown in FIG. 11 in that steps ST40 and ST42 are provided. Therefore, in the following, steps different from the steps in the flowchart shown in FIG. 11 will be described, and the same steps as the steps provided in the flowchart shown in FIG. 11 will be assigned the same step numbers, and the description thereof will be omitted.

In the imaging processing shown in FIG. 13, in a case in which step ST26 is terminated, the imaging processing proceeds to step ST40. In step ST40, the control unit 93 acquires the distance to the face of the person indicated by the specific face image (for example, the face image closest to the center of the live view image) included in the frame having the highest grading value used in the live view image from the distance measurement result of the frame having the highest grading value used in the live view image, and determines whether or not the acquired distance is out of a predetermined range. The predetermined range may be a fixed value, a value changed in response to an instruction received by the reception device 47, or a value changed according to an operation mode and/or the imaging scene of the smart device 10.

In step ST40, in a case in which the distance to the face of the person indicated by the specific face image is within the predetermined range, a negative determination is made, and the imaging processing proceeds to step ST28. In step ST40, in a case in which the distance to the face of the person indicated by the specific face image is out of the predetermined range, a positive determination is made, and the imaging processing proceeds to step ST42.

In step ST42, the control unit 93 moves the zoom lens 30D along the optical axis L2 by a specific moving amount by controlling the motor 162 via the motor driver 164 such that the angle of view becomes the angle of view determined according to the distance to the face of the person indicated by the specific face image. That is, the control unit 93 moves the zoom lens 30D along the optical axis L2 to a position on the optical axis L2, which is a zoom-in position or a zoom-out position determined according to the distance measurement result obtained by the distance measurement operation.

Here, the specific moving amount is, for example, a moving amount derived by the control unit 93 from a moving amount derivation table (not shown) in which the distance and the moving amount of the zoom lens 30D are associated with each other, or a moving amount derivation calculation expression (not shown) in which the distance is an independent variable and the moving amount of the zoom lens 30D is a dependent variable. In a case in which the processing of step ST42 is terminated, the imaging processing proceeds to step ST12.

With the smart device 100 according to the second embodiment, the distance measurement imaging apparatus 114 includes the zoom lens 30D that can move along the optical axis L2. The control unit 93 moves the zoom lens 30D along the optical axis L2 to the position on the optical axis L2, which is the zoom-in position or the zoom-out position determined according to the distance measurement result obtained by the distance measurement operation. Therefore, with this configuration, it is possible to easily move the zoom lens 30D to the position according to the distance measurement result, as compared to a case in which the zoom lens 30D is manually moved.

In addition, in the second embodiment, the aspect example has been described in which the zoom lens 30D is moved by the control unit 93 according to the distance measurement result obtained by the distance measurement operation, but the technology of the present disclosure is not limited to this. For example, the control unit 93 may move the zoom lens 30D according to a zoom operation received by the reception device 47.

Figure 14:
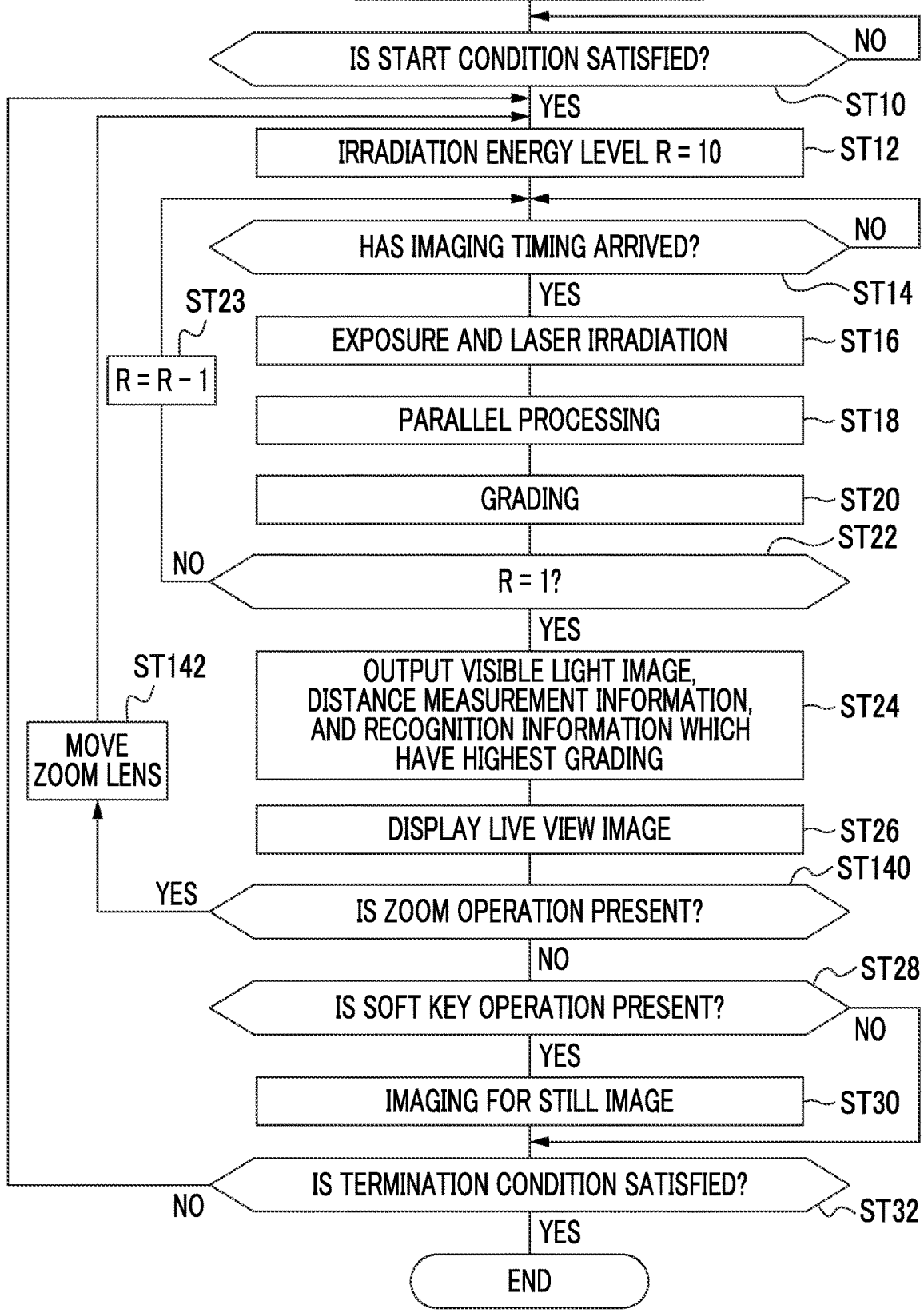
FIG. 14 is a flowchart showing a modification example of a flow of imaging processing according to the second embodiment.

In this case, the imaging processing shown in FIG. 14 is executed by the CPU 15A, for example. The imaging processing shown in FIG. 14 is different from the imaging processing shown in FIG. 13 in that processing of step ST140 is provided instead of processing of step ST40 and step ST142 is provided instead of processing of step ST42.

In the imaging processing shown in FIG. 14, in step ST140, the control unit 93 determines whether or not the zoom operation is performed on the reception device 47. Examples of the zoom operation include a pinch-in operation and a pinch-out operation on the touch panel 48. For example, in a case of zooming in the face of the person indicated by the face image surrounded by the frame line 29, the pinch-out operation is performed on the face image on the touch panel 48, and in a case of zooming out the face of the person, the pinch-out operation is performed on the touch panel 48.

In step ST140, in a case in which the zoom operation is performed on the reception device 47, a positive determination is made, and the imaging processing proceeds to step ST142. In step ST140, in a case in which the zoom operation is not performed on the reception device 47, a negative determination is made, and the imaging processing proceeds to step ST28.

In step ST142, the control unit 93 moves the zoom lens 30D along the optical axis L2 by a moving amount corresponding to the zoom operation by controlling the motor 162 via the motor driver 164. Thereafter, the imaging processing proceeds to step ST12. The angle of view is changed by executing the processing of step ST142.

Third Embodiment

Figure 8:
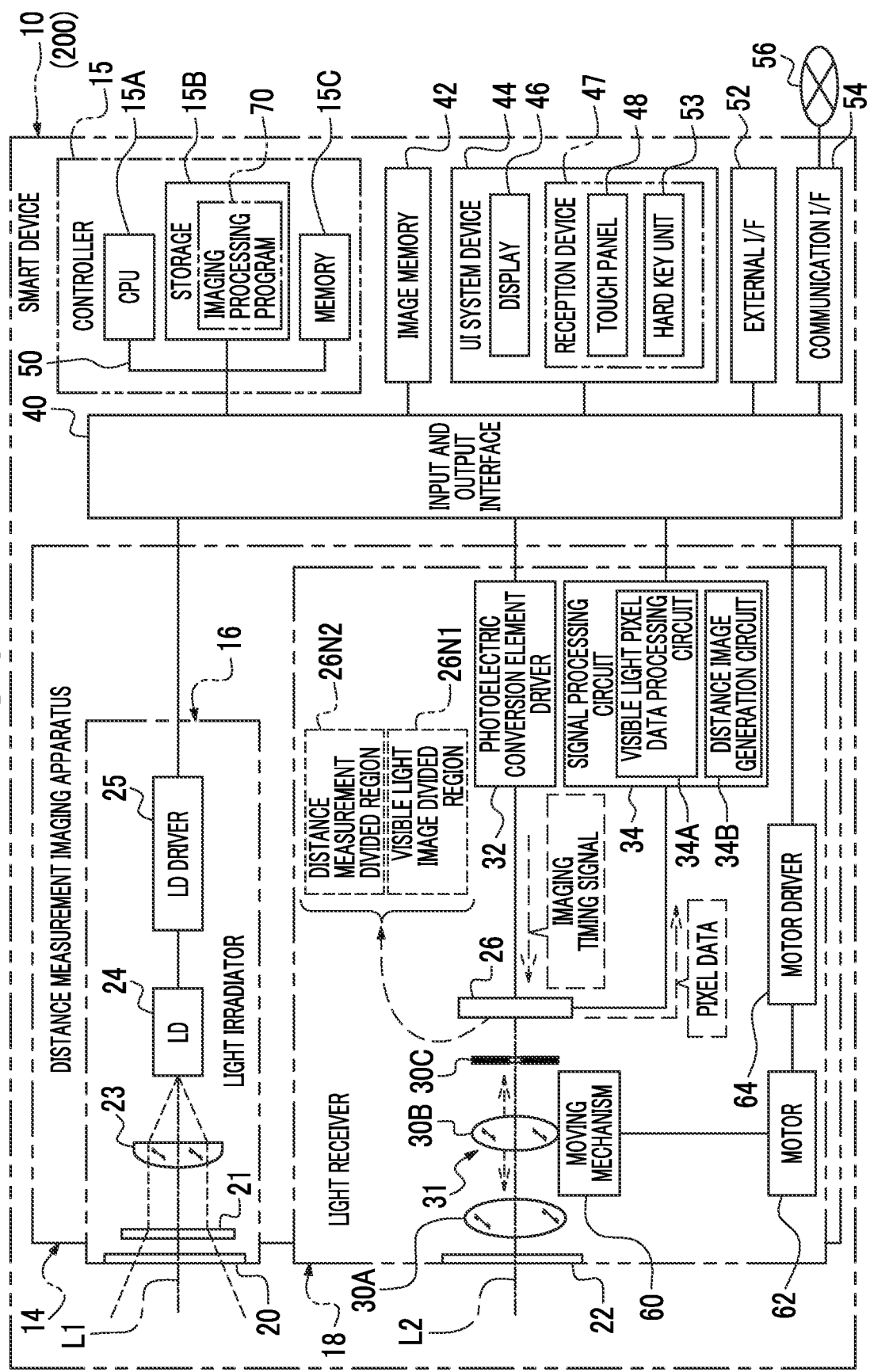
FIG. 8 is a block diagram showing an example of a hardware configuration of an electric system of the smart device according to the first embodiment.

As shown in FIG. 8 as an example, a smart device 200 according to a third embodiment has the same configuration as the smart device 10 according to the first embodiment. Hereinafter, a different point of the imaging processing of the smart device 200 according to the third embodiment from the imaging processing of the smart device 10 according to the first embodiment will be described.

Figure 11:
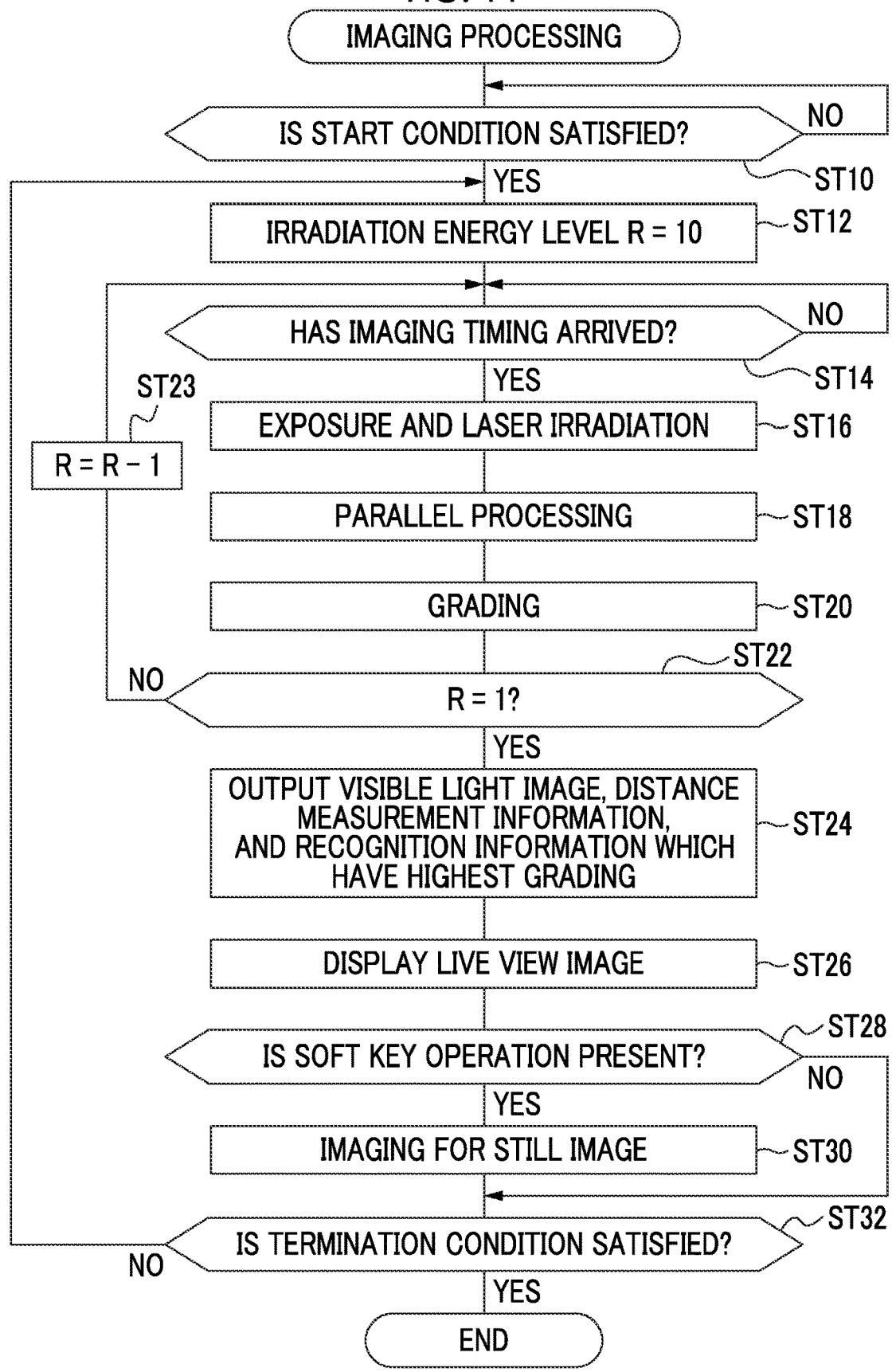
FIG. 11 is a flowchart showing an example of a flow of imaging processing according to the first embodiment.
Figure 15:
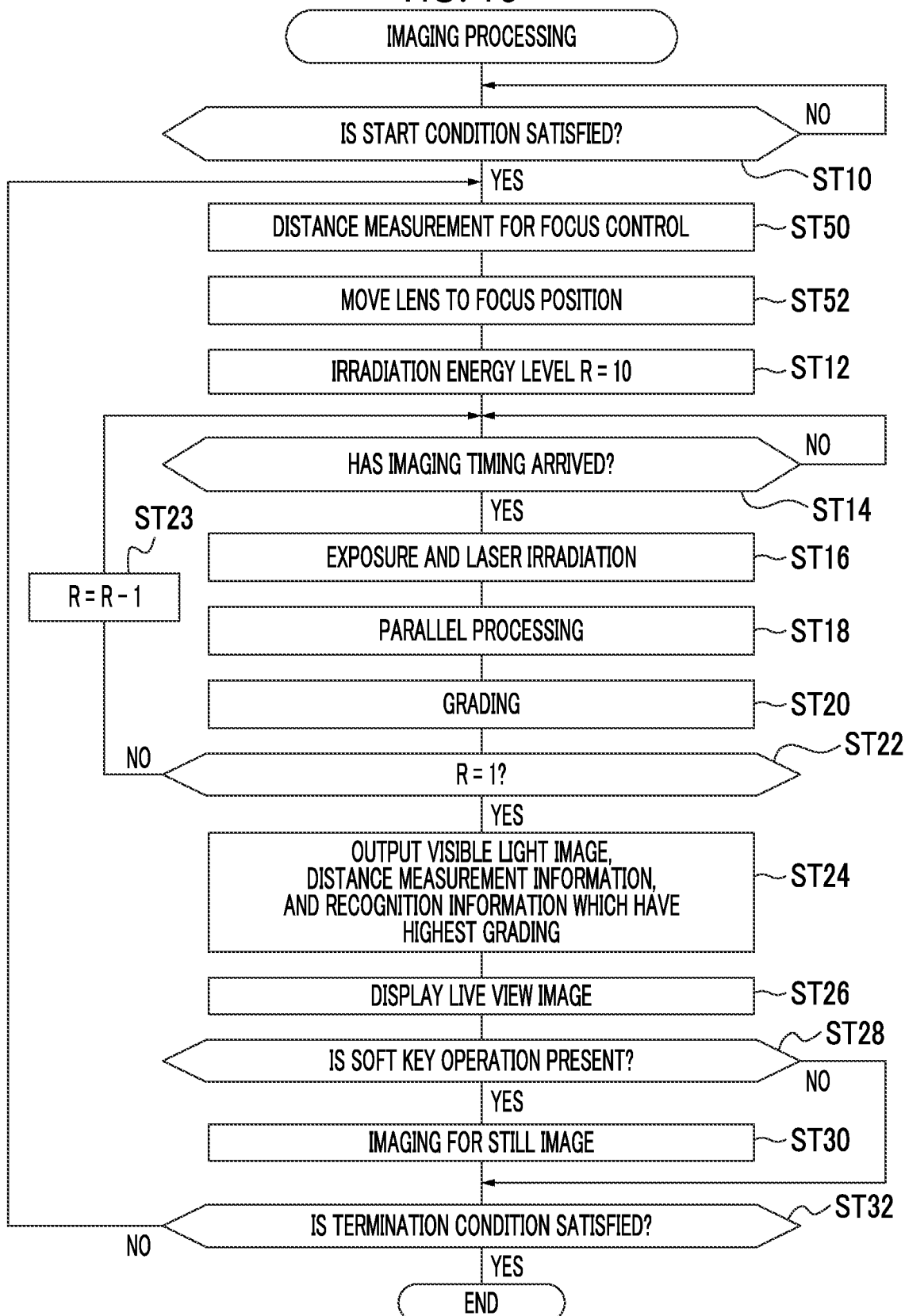
FIG. 15 is a flowchart showing an example of a flow of imaging processing according to a third embodiment.

As shown in FIG. 15 as an example, the imaging processing according to the third embodiment is different from the imaging processing shown in FIG. 11 in that step ST50 and step ST52 are provided between steps ST10 and ST12.

In the imaging processing shown in FIG. 15, in step ST50, the control unit 93 performs a distance measurement for a focus control. By executing step ST50, the light irradiator 16 emits the laser beam to all or a part (for example, the center portion) of the imaging region, and the distance measurement divided region 26N2 receives the IR reflected light. The pixel data obtained by receiving the IR reflected light by the distance measurement divided region 26N2 is transmitted to the IR pixel data processing circuit 34B, and the distance from the smart device 200 to all or a part of the imaging region is measured based on the time required from the emission of the laser beam to the reception of the IR reflected light, and the light speed. The distance measurement result obtained as described above is stored in the image memory 42 by the IR pixel data processing circuit 34B.

In subsequent step ST52, the control unit 93 moves the focus lens 30B to the focus position determined according to the distance measurement result stored in the image memory 42 by executing step ST50. The focus position is derived by the control unit 93 from a focus position derivation table (not shown) or a focus position derivation arithmetic expression (not shown) as in the first embodiment.

With the smart device 200 according to the third embodiment, the distance measurement imaging apparatus 14 (imaging unit) includes the focus lens 30B that can move along the optical axis L2. Prior to the recognition operation, the distance measurement imaging apparatus 14 (distance measurement unit) performs the distance measurement for the focus control by emitting the laser beam to the imaging region and receiving the IR reflected light from the imaging region. The control unit 93 moves the focus lens 30B along the optical axis L2 to the focus position determined according to the distance measurement result obtained by the distance measurement for the focus control. Therefore, with this configuration, the focus lens 30B is moved to the focus position before the recognition operation is performed. Therefore, it is possible for the smart device 200 to improve the image quality of the visible light image obtained by performing the parallel processing, as compared to a case in which the focus lens 30B is moved to the focus position before the recognition operation is performed. As a result, it is possible to improve the accuracy of image recognition for the visible light image obtained by performing the parallel processing, as compared to a case in which the focus lens 30B is not moved to the focus position before the recognition operation is performed.

Other Embodiments

In each of the embodiments described above, the aspect example has been described in which the IR reflected light is received by the distance measurement divided region 26N2, but the technology of the present disclosure is not limited to this, and the IR reflected light may be received by the IR pixel of a part of the distance measurement divided region 26N2.

Figure 16:
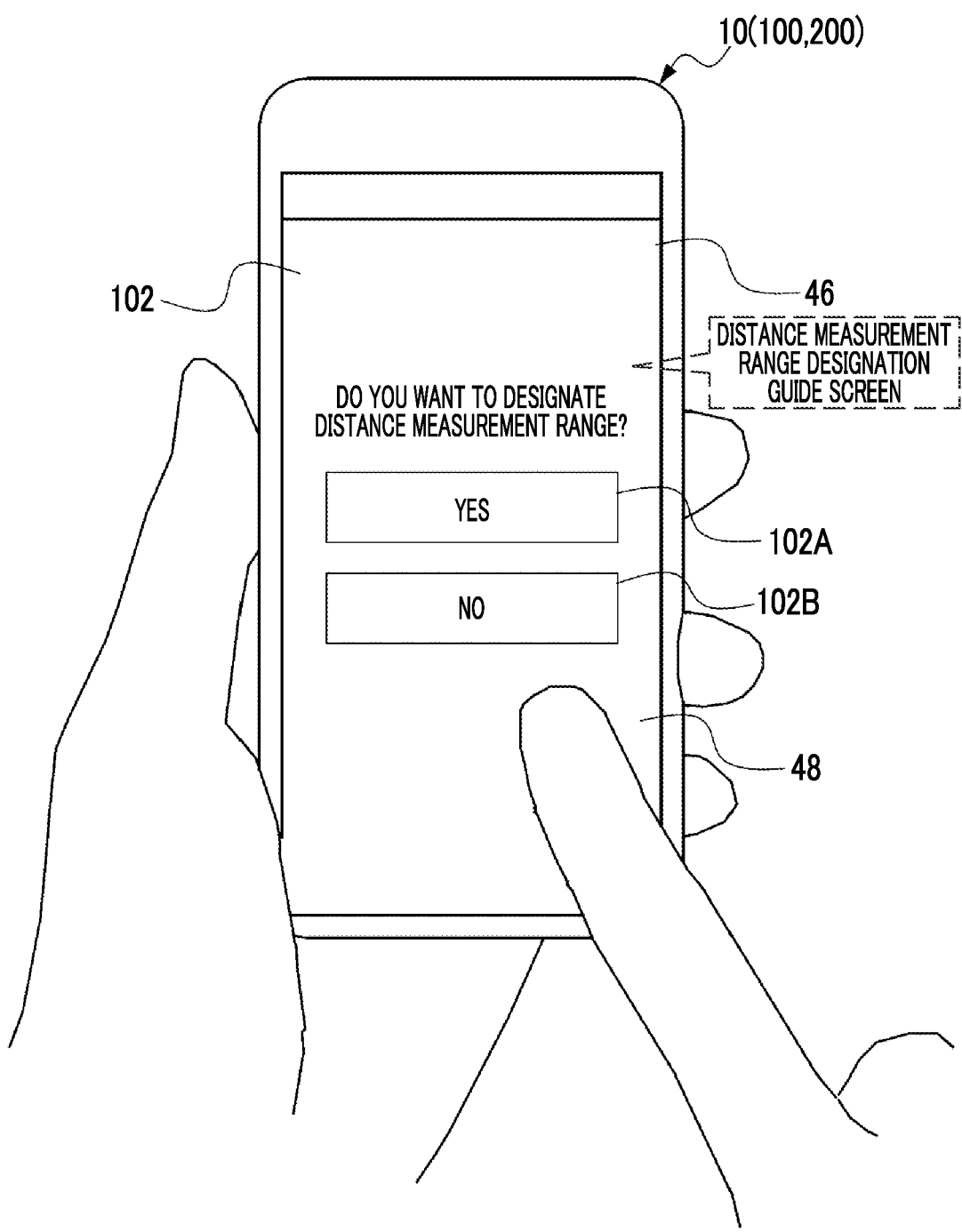
FIG. 16 is a schematic screen view showing an example of a distance measurement range designation guide screen displayed on the display provided in the smart device according to other embodiments.

In this case, for example, as shown in FIG. 16, the control unit 93 causes the display 46 to display the distance measurement range designation guide screen 102. The distance measurement range designation guide screen 102 is a screen for guiding the user or the like to designate a distance measurement range. On the distance measurement range designation guide screen 102, a message asking the user whether or not to designate the distance measurement range (hereinafter, also referred to as a "guide message") is displayed. In the example shown in FIG. 16, a message "Do you want to designate the distance measurement range?" is shown as an example of the guide message. In addition, soft keys 102A and 102B are displayed on the distance measurement range designation guide screen 102. The soft key 102A is turned on by the user or the like via the touch panel 48 in a case in which the user or the like designates the distance measurement range. The soft key 102B is turned on by the user or the like via the touch panel 48 in a case in which the user or the like does not designate the distance measurement range, that is, in a case in which the entire imaging region is set as the distance measurement range.

Figure 17:
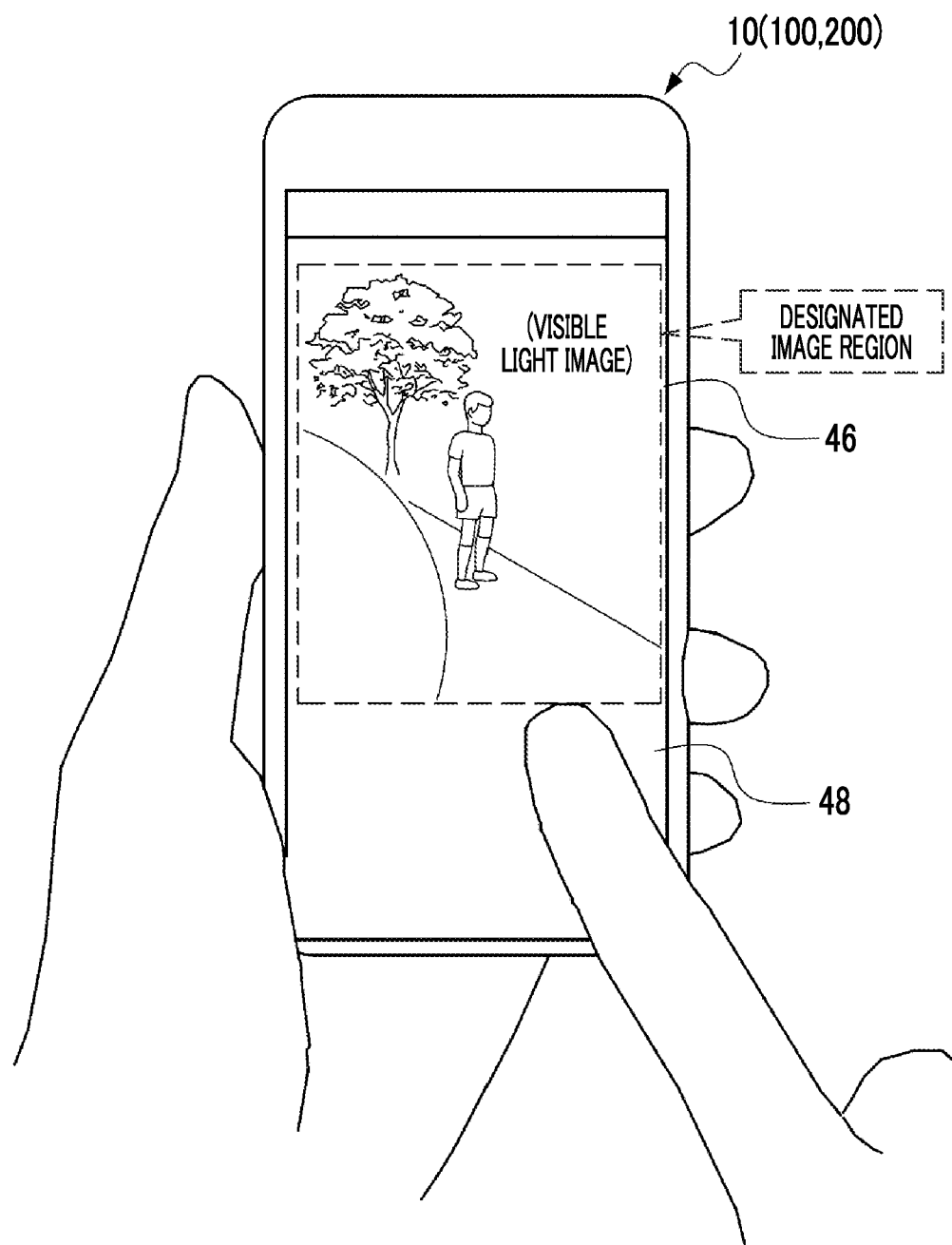
FIG. 17 is a schematic screen view showing an example of the visible light image displayed as a live view image on the display provided in the smart device according to other embodiments and a designated image region.

In a case in which the soft key 102A is turned on by the user or the like via the touch panel 48 in a state in which the distance measurement range designation guide screen 102 is displayed on the display 46, as shown in FIG. 17 as an example, the control unit 93 displays the visible light image as the live view image on the display 46. In a state in which the live view image is displayed on the display 46, the image region (in the example shown in FIG. 17, a rectangular region surrounded by a broken line on the visible light image) is designated by the user or the like via the touch panel 48. A real space region corresponding to the image region designated by the user or the like (hereinafter, also referred to as a "designated image region") is designated as the distance measurement target by the distance measurement imaging apparatus 14.

Figure 18:
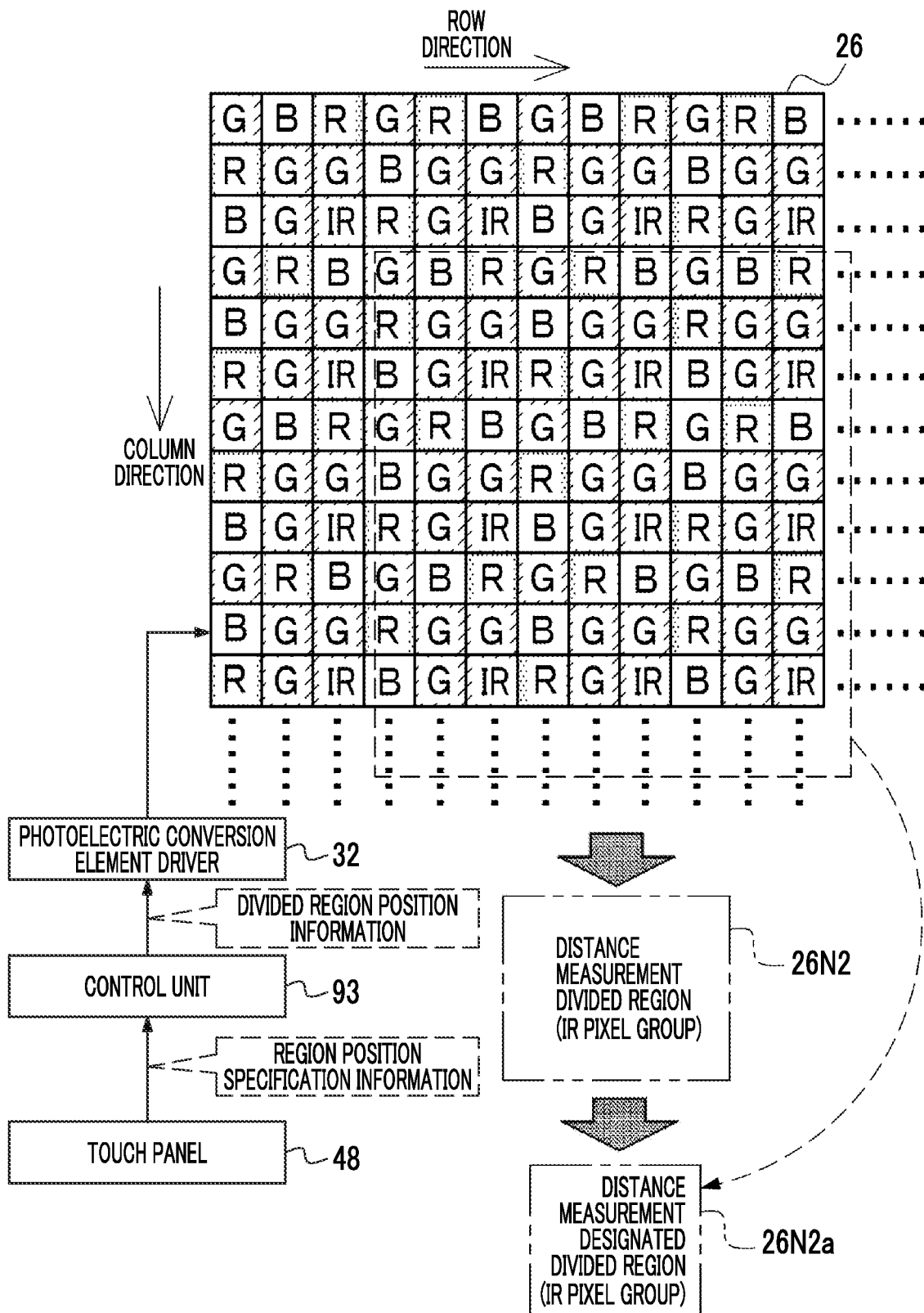
FIG. 18 is a conceptual diagram for describing an example of how to narrow down the photoelectric conversion element provided in the smart device according to the other embodiments from a distance measurement divided region to a distance measurement designated divided region.

In this case, as shown in FIG. 18 as an example, region position specification information (for example, coordinates) for specifying a position of the designated image region on the visible light image is output from the touch panel 48 to the control unit 93. The control unit 93 outputs divided region position information (for example, pixel address) for specifying a position of a distance measurement designated divided region 26N2a in the distance measurement divided region 26N2 to the photoelectric conversion element driver 32. Here, the distance measurement designated divided region 26N2a refers to a divided region of the distance measurement divided region 26N2 at a position corresponding to the position of the designated image region specified by the region position specification information input from the touch panel 48.

The photoelectric conversion element driver 32 causes the distance measurement imaging apparatuses 14 and 114 to perform the distance measurement by using the IR reflected light received by only the distance measurement designated divided region 26N2a by driving only the distance measurement designated divided region 26N2a in the distance measurement divided region 26N2 in the distance measurement operation. That is, the distance measurement is performed by using the IR reflected light received by only at least one IR pixel included in the designated region among the plurality of IR pixels.

In the examples shown in FIGS. 16 to 18, the distance measurement is performed by narrowing down the distance measurement target (so called ROI) designated by the user or the like by changing the distance measurement divided region 26N2 to the distance measurement designated divided region 26N2a, but a method of narrowing down the distance measurement target is not limited to this. For example, a control of changing a beam diameter and/or direction of the laser beam by the control unit 93 in response to the instruction received by the reception device 47 may be performed such that the laser beam is emitted to the distance measurement target designated by the user or the like.

Figure 19:
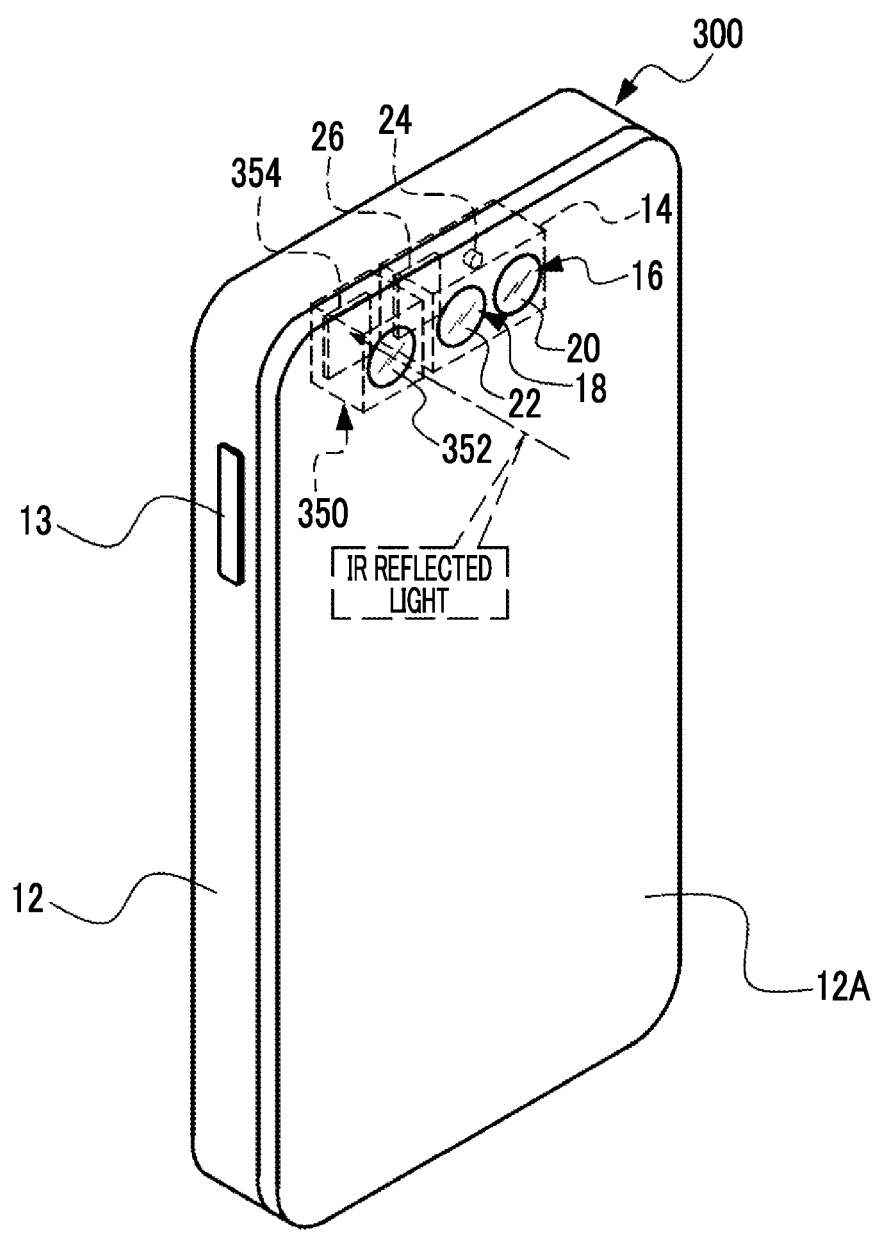
FIG. 19 is a schematic perspective view showing a first modification example of the appearance configuration of the smart device according to other embodiments.

In each of the embodiments described above, the smart devices 10, 100, and 200 equipped with the light receiver 18 have been described as an example, but the technology of the present disclosure is not limited to this, and for example, as shown in FIG. 19, a smart device 300 equipped with the light receivers 18 and 350 may be adopted. As shown in FIG. 19 as an example, a light transmitting window 352, which is adjacent to the light transmitting window 22, is provided in the upper left portion of the rear surface 12A of the housing 12 in a case in which the smart device 300 is put into a vertically placed state (the upper left portion of the rear view of the smart device 300 in the vertically placed state). The light transmitting window 352 is an optical element having transmittance (for example, a lens) like the light transmitting windows 20 and 22, and the light transmitting windows 20, 22, and 352 are arranged at a predetermined interval along the horizontal direction. The light transmitting window 352 is also exposed from the rear surface 12A like the light transmitting windows 20 and 22.

The light receiver 350 comprises a photoelectric conversion element 354. The photoelectric conversion element 354 is a photoelectric conversion element specialized for receiving the IR reflected light, and has a plurality of IR pixels arranged in a matrix. Examples of the plurality of IR pixels include photodiode auto (for example, InGaAs APD) for the IR pixels for "4896×3265" pixels. The photoelectric conversion element 354 receives the IR reflected light taken into the light receiver 350 through the light transmitting window 352, and outputs the electric signal according to the light amount of the received IR reflected light to the signal processing circuit 34 (see FIG. 8).

Figure 20:
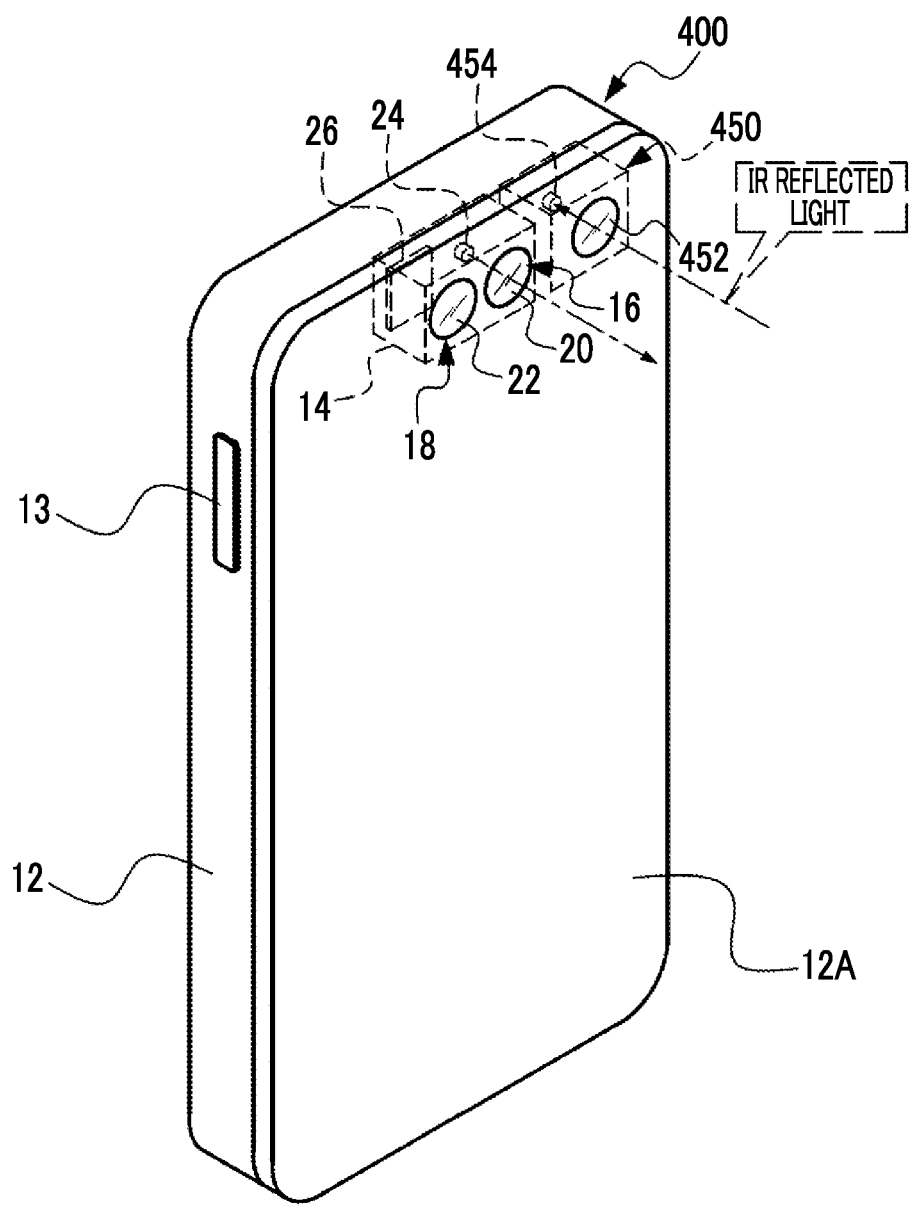
FIG. 20 is a schematic perspective view showing a second modification example of the appearance configuration of the smart device according to other embodiments.

In addition, in the example shown in FIG. 19, the smart device 300 equipped with the light receivers 18 and 350 is described, but the technology of the present disclosure is not limited to this, and for example, as shown in FIG. 20, a smart device 400 equipped with the light receivers 18 and 450 may be used. As shown in FIG. 20 as an example, a light transmitting window 452, which is adjacent to the light transmitting window 20, is provided in the upper right portion of the rear surface 12A of the housing 12 in a case in which the smart device 400 is put into a vertically placed state (the upper right portion of the rear view of the smart device 400 in the vertically placed state). The light transmitting window 452 is an optical element having transmittance (for example, a lens) like the light transmitting windows 20 and 22, and the light transmitting windows 452, 20, and 22 are arranged at a predetermined interval along the horizontal direction. The light transmitting window 452 is also exposed from the rear surface 12A like the light transmitting windows 20 and 22.

The light receiver 450 comprises a single photodiode 454. The photodiode 454 is, for example, a photodiode capable of receiving the IR reflected light. Examples of the photodiode 454 include InGaAs APD. The photodiode 454 receives the IR reflected light taken into the light receiver 450 through the light transmitting window 452, and outputs the electric signal according to the light amount of the received IR reflected light to the signal processing circuit 34 (see FIG. 8).

In each of the embodiments described above, the laser beam has been described as an example of the "light" according to the technology of the present disclosure, but the technology of the present disclosure is not limited to this, and instead of the laser beam, super-luminescent light may be used, and the distance measurement need only be performed by using the light having the directivity capable of measuring the distance.

Figure 21:
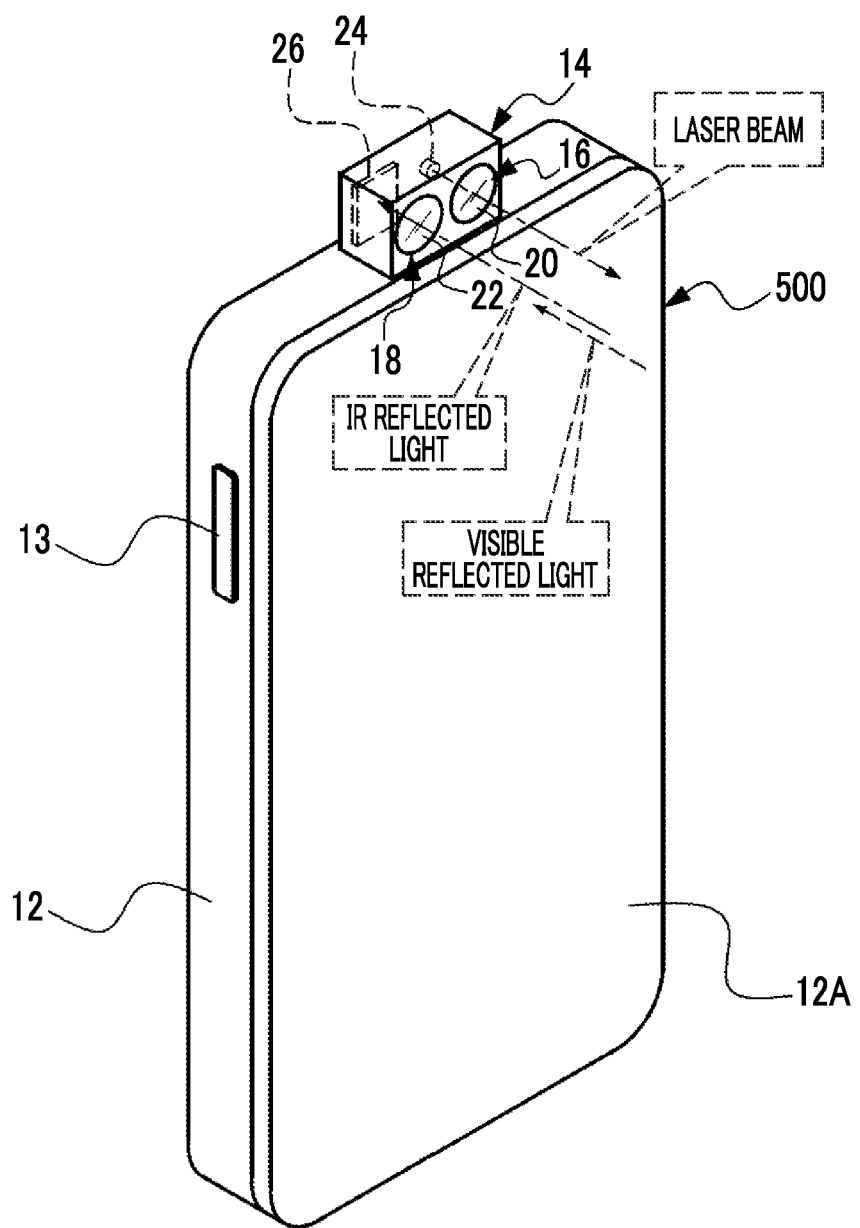
FIG. 21 is a schematic perspective view showing an example of an appearance configuration in which the distance measurement imaging apparatus and the smart device according to other embodiments are combined.

In addition, in each of the embodiments described above, the aspect example has been described in which the distance measurement imaging apparatus 14 is built in the smart device 10, but the technology of the present disclosure is not limited to this. For example, as shown in FIG. 21, the distance measurement imaging apparatus 14 may be externally attached to a general smart device 500, that is, the smart device 500 in which the distance measurement imaging apparatus 14 is not built.

In addition, in each of the embodiments described above, the aspect example has been described in which the UI system device 44 is incorporated in the smart device 10, but at least a part of a plurality of components provided in the UI system device 44 may be externally attached to the smart device 10. In addition, at least a part of the plurality of components provided in the UI system device 44 may be used by being connected to the external I/F 52 as a separate body.

In addition, in the example shown in FIG. 1, the smart device 10 has been described as an example, but the technology of the present disclosure is not limited to this. That is, the technology of the present disclosure can also be applied to various electronic apparatuses (for example, an interchangeable lens camera, a fixed lens camera, a personal computer, and/or a wearable terminal device) in which the distance measurement imaging apparatus 14 is built, and even with these electronic apparatuses, the same operations and effects as those of the smart device 10 can be obtained.

In addition, in each of the embodiments described above, the display 46 has been described as an example, but the technology of the present disclosure is not limited to this.

For example, a separate display retrofitted to the smart device 10 may be used as a "display unit" according to the technology of the present disclosure.

In addition, in the embodiments described above, the aspect example has been described in which the recognition unit 94 is mounted in the smart device 10, but the technology of the present disclosure is not limited to this. For example, an external device including the recognition unit 94 (for example, another smart device, a personal computer and/or a server) may be connected to the smart device 10. In this case, the image recognition result provided to the smart device 10 from the external device need only be acquired by the CPU 15A of the smart device 10. In addition, the cloud computing (not shown) may be provided with the function of the recognition unit 94, and the cloud computing may provide the image recognition result to the smart device 10. In this case, the image recognition result provided to the smart device 10 from the cloud computing need only be acquired by the CPU 15A of the smart device 10.

Figure 22:
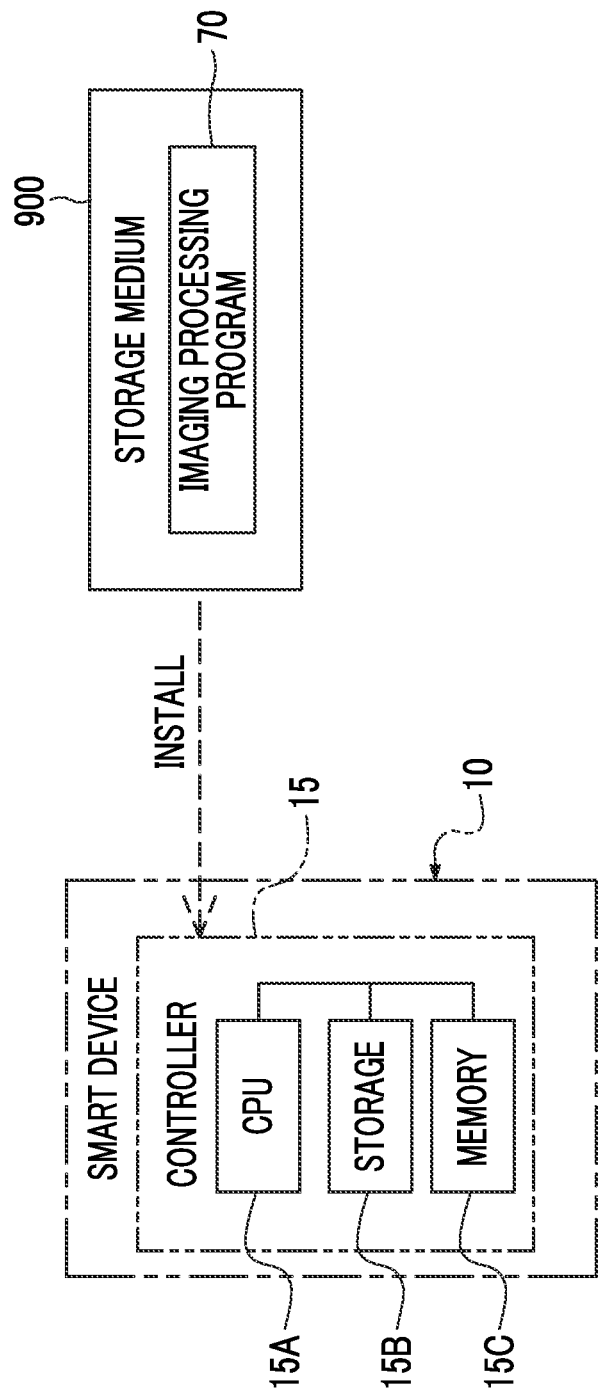
FIG. 22 is a conceptual diagram showing an example of an aspect in which the imaging processing program is installed in the smart device.

In addition, in each of the embodiments described above, the aspect example has been described in which the imaging processing program 70 is stored in the storage 15B, but the technology of the present disclosure is not limited to this. For example, the imaging processing program 70 may be stored in the storage medium 900, as shown in FIG. 22. Examples of the storage medium 900 include any portable storage medium, such as an SSD or a USB memory.

The imaging processing program 70 stored in the storage medium 900 is installed in the controller 15. The CPU 15A executes the imaging processing according to the imaging processing program 70.

In addition, the imaging processing program 70 may be stored in a storage unit of another computer or server device connected to the controller 15 via a communication network (not shown), and the imaging processing program 70 may be downloaded in response to a request of the smart device 10 and installed in the controller 15.

Note that it is not necessary to store the entire imaging processing program 70 in the storage unit of the other computer or server device connected to the controller 15, or the storage 15B, and a part of the imaging processing program 70 may be stored.

In the example shown in FIG. 22, the aspect example has been described in which the controller 15 is built in the smart device 10, but the technology of the present disclosure is not limited to this, and for example, the controller 15 may be provided outside the smart device 10.

In the example shown in FIG. 22, the CPU 15A is one CPU, but may be a plurality of CPUs. In addition, a GPU may be applied instead of the CPU 15A.

In the example shown in FIG. 22, the controller 15 has been described as an example, but the technology of the present disclosure is not limited to this, and a device including an ASIC, an FPGA, and/or a PLD may be applied instead of the controller 15. In addition, instead of the controller 15, a hardware configuration and a software configuration may be used in combination.

The following various processors can be used as a hardware resource for executing the imaging processing described in each of the embodiments described above. Examples of the processor include the CPU, which is a general-purpose processor that functions as software, that is, a hardware resource for executing the imaging processing by executing the program. In addition, examples of the processor include a dedicated electric circuit which is a processor having a circuit configuration specially designed for executing specific processing, such as an FPGA, a PLD, or an ASIC. A memory is also built in or connected to each processor, and each processor executes the imaging processing by using the memory.

The hardware resource for executing the imaging processing may be configured by one of the various processors, or may be a combination of two or more processors of the same type or different types (for example, a combination of a plurality of FPGAs or a combination of a CPU and an FPGA). In addition, the hardware resource for executing the imaging processing may be one processor.

Examples of the configuration with one processor include, first, a mode in which one processor is configured by a combination of one or more CPUs and software, and this processor functions as the hardware resource for executing the imaging processing. Secondly, as represented by SoC, there is a mode in which a processor that realizes the functions of the whole system including a plurality of the hardware resources for executing the imaging processing with one IC chip is used. As described above, the imaging processing is realized by using one or more of the various processors described above as the hardware resource.

Further, as the hardware structures of these various processors, more specifically, an electric circuit in which circuit elements, such as semiconductor elements, are combined can be used. In addition, the imaging processing is merely an example. Therefore, it is needless to say that unnecessary steps may be deleted, new steps may be added, or the processing order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and represented by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

With respect to the embodiments described above, the following supplementary note will be further disclosed.

Supplementary Note

A processing apparatus including a processor, and a memory connected to or built in the processor, in which the processor executes a process including performing a control of performing, a plurality of times in parallel, a recognition operation in which a recognition unit recognizes a specific subject included in an imaging region based on a captured image obtained by imaging the imaging region by an imaging unit, and a distance measurement operation in which a distance measurement unit performs distance measurement by emitting light to the imaging region and receiving reflected light of the light from the imaging region, and changing irradiation energy of the light to the imaging region for each distance measurement operation.

What is claimed is:

1. A processing apparatus comprising:
a processor; and
a memory coupled to or built in the processor,
wherein the processor
performs control for performing, a plurality of times in parallel, a recognition operation in which a recognition processor recognizes a specific subject included in an imaging region based on a captured image obtained by imaging the imaging region by an imaging apparatus, and a distance measurement operation in which a distance measurement device performs distance measurement by emitting light to the imaging region and receiving reflected light of the light from the imaging region.

2. The processing apparatus according to claim 1,
wherein irradiation energy of the light to the imaging region is determined for each distance measurement operation.

3. The processing apparatus according to claim 1,
wherein the processor changes irradiation energy of the light regardless of a reflectivity of the imaging region.

4. The processing apparatus according to claim 1,
wherein the processor outputs a recognition result obtained by the recognition operation and a distance measurement result obtained by the distance measurement operation to a specific output destination according to a specific time among the plurality of times.

5. The processing apparatus according to claim 4,
wherein the specific output destination is a display capable of displaying at least one of the recognition result or the distance measurement result.

6. The processing apparatus according to claim 5,
wherein the display displays a specific subject image showing the specific subject and an image surrounding the specific subject image as the recognition result.

7. The processing apparatus according to claim 1,
wherein the imaging apparatus includes a lens capable of moving along an optical axis, and
the processor moves the lens along the optical axis to a position on the optical axis, the position being determined according to a distance measurement result obtained by the distance measurement operation.

8. The processing apparatus according to claim 7,
wherein the position is a focus position.

9. The processing apparatus according to claim 1,
wherein the imaging apparatus includes a lens capable of moving along an optical axis,
the distance measurement device performs distance measurement for focus control by emitting light for focus control to the imaging region and receiving reflected light for focus control of the light for focus control with respect to the imaging region prior to the recognition operation, and
the processor moves the lens along the optical axis to a focus position determined according to a distance measurement result obtained by the distance measurement for focus control.

10. The processing apparatus according to claim 1,
wherein the processor performs specific processing using a plurality of recognition results obtained by the recognition operation performed the plurality of times.

11. The processing apparatus according to claim 10,
wherein the specific processing is processing in which the recognition result is output to an exterior.

12. The processing apparatus according to claim 10,
wherein the specific processing is processing in which the recognition result and the captured image are created as a file in a specific format type.

13. The processing apparatus according to claim 1,
wherein the processor integrates a recognition result obtained by the recognition operation and a distance measurement result obtained by the distance measurement operation in the recognition operation and the distance measurement operation that are performed in parallel.

14. The processing apparatus according to claim 1,
wherein a recognition result obtained by the recognition operation is weighted according to at least one of the specific subject or irradiation energy of the light used in the distance measurement operation parallel to the recognition operation.

15. The processing apparatus according to claim 1,
wherein a recognition result obtained by the recognition operation is weighted according to irradiation energy of the light used in the distance measurement operation parallel to the recognition operation.

16. A processing apparatus comprising:
a processor; and
a memory coupled to or built in the processor,
wherein the processor
performs control for performing, a plurality of times in parallel, a recognition operation in which a recognition processor recognizes a specific subject included in an imaging region based on a captured image obtained by imaging the imaging region by an imaging apparatus, and a distance measurement operation in which a distance measurement device performs distance measurement by emitting light to the imaging region and receiving reflected light of the light from the imaging region, and
wherein a distance measurement result obtained by the distance measurement operation is weighted according to irradiation energy of the light used in the distance measurement operation.

17. The processing apparatus according to claim 16,
wherein a weight of the distance measurement result in a case in which the irradiation energy is first irradiation energy is larger than a weight of the distance measurement result in a case in which the irradiation energy is second irradiation energy that is smaller than the first irradiation energy.

18. The processing apparatus according to claim 14,
wherein a weight of the recognition result in a case in which the irradiation energy is first irradiation energy is larger than a weight of the recognition result in a case in which the irradiation energy is second irradiation energy that is smaller than the first irradiation energy.

19. The processing apparatus according to claim 14,
wherein the processor causes the imaging apparatus to perform imaging by main exposure based on the recognition result selected according to the weighting.

20. The processing apparatus according to claim 1, wherein the specific subject is a face.

21. The processing apparatus according to claim 20, wherein the face is a face with a specific facial expression.

22. The processing apparatus according to claim 1, wherein the specific subject is an object having a reflectivity less than a threshold value.

23. An electronic apparatus comprising:
the processing apparatus according to claim 1; and
at least one of the recognition processor or the distance measurement device.

24. A processing method comprising:
performing control for performing, a plurality of times in parallel, a recognition operation in which a recognition processor recognizes a specific subject included in an imaging region based on a captured image obtained by imaging the imaging region by an imaging apparatus, and a distance measurement operation in which a distance measurement device performs distance measurement by emitting light to the imaging region and receiving reflected light of the light from the imaging region.

25. A non-transitory computer-readable storage medium storing a program executable by a computer to perform a process comprising:
performing control for performing, a plurality of times in parallel, a recognition operation in which a recognition processor recognizes a specific subject included in an imaging region based on a captured image obtained by imaging the imaging region by an imaging apparatus, and a distance measurement operation in which a distance measurement device performs distance measurement by emitting light to the imaging region and receiving reflected light of the light from the imaging region.

* * * * *